(12) United States Patent
Kimura et al.

(10) Patent No.: US 12,370,781 B2
(45) Date of Patent: Jul. 29, 2025

(54) VEHICLE WINDOW STRUCTURE

(71) Applicant: AGC Inc., Tokyo (JP)

(72) Inventors: Takayuki Kimura, Tokyo (JP); Aki Takahashi, Tokyo (JP); Kenichiro Shimo, Tokyo (JP); Takafumi Inoue, Tokyo (JP); Takashi Takada, Tokyo (JP); Youta Oowa, Tokyo (JP); Takashi Sasaki, Tokyo (JP); Naoya Inoue, Tokyo (JP)

(73) Assignee: AGC INC., Tokyo (JP)

( * ) Notice: Subject to any disclaimer, the term of this patent is extended or adjusted under 35 U.S.C. 154(b) by 220 days.

(21) Appl. No.: 18/072,290

(22) Filed: Nov. 30, 2022

(65) Prior Publication Data

US 2023/0086792 A1 Mar. 23, 2023

Related U.S. Application Data

(63) Continuation of application No. PCT/JP2021/020422, filed on May 28, 2021.

(30) Foreign Application Priority Data

Jun. 1, 2020 (JP) .................................. 2020-095772

(51) Int. Cl.
 *B32B 17/10* (2006.01)
 *B32B 7/12* (2006.01)

(52) U.S. Cl.
 CPC .......... *B32B 17/10495* (2013.01); *B32B 7/12* (2013.01); *B32B 17/10036* (2013.01);
 (Continued)

(58) Field of Classification Search
 CPC ........ B32B 17/10045; B32B 17/10697; B32B 2605/006; B32B 17/10669; B32B 17/10541
 See application file for complete search history.

(56) References Cited

U.S. PATENT DOCUMENTS 11,524,493 B2 * 12/2022 Wilson ................... B32B 27/36
2012/0320621 A1 12/2012 Kleo et al.
2018/0370195 A1 * 12/2018 Laluet ................ G02B 27/0101

FOREIGN PATENT DOCUMENTS

JP S63-240423 A 10/1988
JP H05-16725 A 1/1993
(Continued)

OTHER PUBLICATIONS

International Searching Authority, "International Search Report," issued in connection with International Patent Application No. PCT/JP2021/020422, dated Aug. 3, 2021.
(Continued)

*Primary Examiner* — Joseph L Williams
(74) *Attorney, Agent, or Firm* — Foley & Lardner LLP

(57) ABSTRACT

The disclosure provides a vehicle window structure in which a light emitting device can be disposed outside the laminated glass. The disclosure also provides a vehicle window structure to be installed at an opening of a vehicle, which comprises a first glass plate and a light emitting device, wherein at least a part of the light emitting device is disposed in a space formed between the first glass plate, an adhesive bonding the first glass plate and a body flange of the vehicle, and an interior material of the vehicle.

17 Claims, 10 Drawing Sheets

(52) U.S. Cl.
CPC .... *B32B 17/10348* (2013.01); *B32B 17/1044* (2013.01); *B32B 17/10541* (2013.01); *B32B 2250/03* (2013.01); *B32B 2250/40* (2013.01); *B32B 2307/416* (2013.01); *B32B 2307/422* (2013.01); *B32B 2605/006* (2013.01)

(56) References Cited

FOREIGN PATENT DOCUMENTS

| | | |
|---|---|---|
| JP | 2003-019922 A | 1/2003 |
| JP | 2019-522613 A | 8/2019 |

OTHER PUBLICATIONS

International Searching Authority, "Written Opinion," issued in connection with International Patent Application No. PCT/JP2021/020422, dated Aug. 3, 2021.

PCT International Preliminary Report on Patentability, dated Dec. 6, 2022, which includes a Translation of International Searching Authority, "Written Opinion," issued in connection with International Patent Application No. PCT/JP2021/020422, dated Aug. 3, 2021.

* cited by examiner

VEHICLE WINDOW STRUCTURE

CROSS-REFERENCE TO RELATED APPLICATIONS

This application is a Bypass Continuation of PCT Application No. PCT/JP2021/020422, filed on May 28, 2021, which is based upon and claims the benefit of priority from Japanese Patent Application No. 2020-095772 filed on Jun. 1, 2020. The contents of those applications are incorporated herein by reference in their entireties.

TECHNICAL FIELD

The present invention relates to a vehicle window structure.

BACKGROUND ART

Techniques to enclose a structure such as a light emitting device in a laminated glass have been known. For example, a technique to enclose a light emitting diode mounted on a printed circuit board at a peripheral region of a laminated glass used as a windshield may be mentioned. A light emitting diode is enclosed, for example, in an interlayer of the laminated glass and displays alert (collision avoidance alert) to the driver (for example, Patent Document 1).

PRIOR ART DOCUMENTS

Patent Document

Patent Document 1: JP-A-2019-522613

DISCLOSURE OF INVENTION

Technical Problem

However, according to an embodiment in which a light emitting device containing e.g. a light emitting diode is enclosed in the interlayer of a laminated glass, for example, if cracks are made in the glass plate in production of the laminated glass or the light emitting device has a malfunction, the whole laminated glass is unusable. As a result, the production efficiency decreases, thus increasing the production cost. Further, maintenance of the laminated glass having a light emitting device sealed in, after entry into the market, can hardly be done.

Under these circumstances, the object of the present invention is to provide a vehicle window structure in which a light emitting device can be disposed outside the laminated glass or outside a single glass plate.

Solution to Problem

The vehicle window structure according to an embodiment of the present invention is a vehicle window structure to be installed at an opening of a vehicle, which comprises a first glass plate and a light emitting device, wherein at least a part of the light emitting device is disposed in a space formed between the first glass plate, an adhesive bonding the first glass plate and a body flange of the vehicle, and an interior material of the vehicle.

Advantageous Effects of Invention

According to an embodiment of the present disclosure, a light emitting device can be disposed outside a laminated glass or outside a single plate glass. Thus, it is possible to provide a vehicle window structure such that a decrease of the production efficiency and an increase of the production cost can be suppressed even when cracks are made in the glass plate in production of the laminated glass or the single plate glass, or the light emitting device has a malfunction, and further, maintenance of the laminated glass or the single plate glass containing at least a part of the light emitting device, after entry into the market, can be improved.

DESCRIPTION OF EMBODIMENTS

Figure 1A:
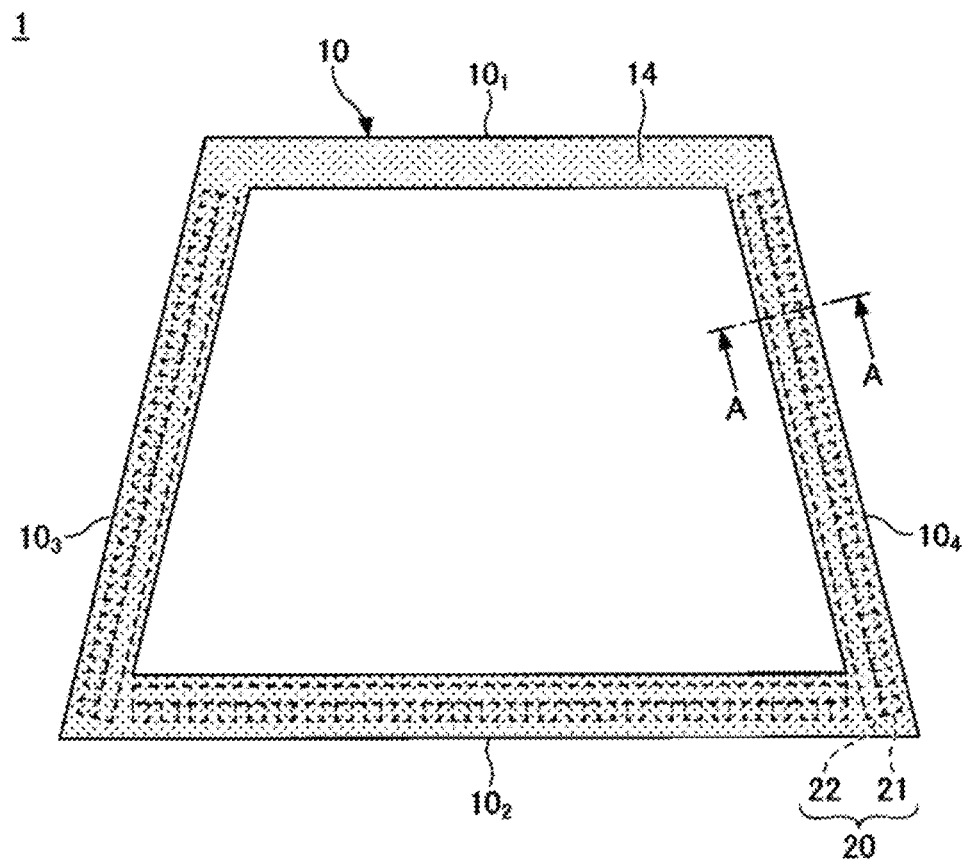
FIGS. 1(a) and 1(b) are views illustrating a vehicle window structure according to a first embodiment of the present invention.

Now, the present invention will be described with reference to drawings. In the drawings, the same constituent is represented by the same reference symbol and repetition of description may be omitted. Further, for understanding of the embodiment of the present invention, the size and the shape in the drawings may partly be exaggerated in some cases.

Vehicles typically mean automobiles but mean moving objects having a laminated glass or a single plate glass, including trains, ships, aircrafts, etc. Hereinafter, a vehicle window structure having a laminated glass will be described as an example, however, the vehicle window structure may have a single plate glass.

"Viewed two-dimensionally" means to view a predetermined region of the laminated glass from the normal direction on the surface on the vehicle interior side of the laminated glass. A two dimensional shape means a shape of a predetermined region of the laminated glass as viewed from the normal direction on the surface on the vehicle interior side of the laminated glass.

Figure 1B:
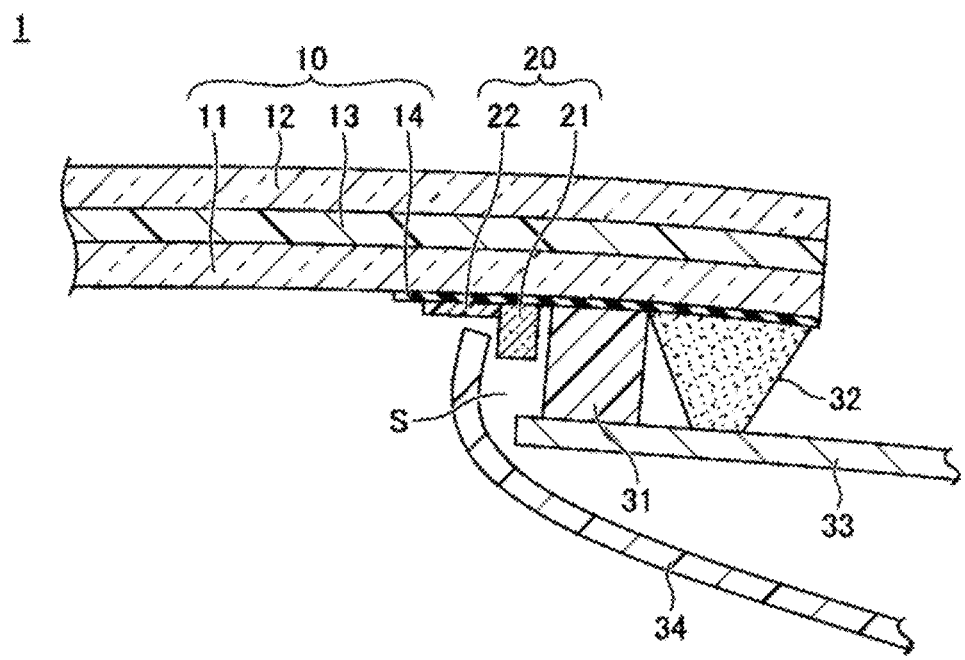

FIGS. 1(a) and 1(b) are views illustrating the vehicle window structure according to the first embodiment of the present invention. FIG. 1(a) schematically illustrates a state where the vehicle window structure attached to the vehicle is visually recognized from the vehicle inside toward the vehicle outside. FIG. 1(b) is a partially enlarged cross sectional view along the line A-A of FIG. 1(a). In FIG. 1(a), illustrations of the dam rubber 31, the urethane adhesive 32, etc. shown in FIG. 1(b) are omitted.

As shown in FIGS. 1(a) and 1(b), the vehicle window structure 1 according to the first embodiment has a laminated glass 10 and a light emitting device 20. The laminated glass 10 is fixed to a body flange 33 protruding from the outer periphery of the substantially rectangular opening of a vehicle body toward the inside, via the dam rubber 31 and the urethane adhesive 32 provided at the peripheral portion on the surface on the vehicle interior side of the laminated glass 10. The reference symbol 34 indicates an interior material of the vehicle.

In the following description, the reference symbol $10_1$ indicates the upper edge portion of the laminated glass 10, the reference symbol $10_2$ indicates the lower edge portion, the reference symbol $10_3$ indicates the left edge portion, and the reference symbol $10_4$ indicates the right edge portion. When the laminated glass 10 attached to a right handle vehicle is viewed from the vehicle interior side, the upper edge portion means the edge portion on the roof side of the vehicle, the lower edge portion means the edge portion on the engine room side, the left edge portion means the edge portion on the passenger seat side, and the right edge portion means the edge portion on the driver's seat side.

The laminated glass 10 according to the first embodiment is a laminated glass for vehicles, comprising a glass plate 11, a glass plate 12, an interlayer 13 and a shielding layer 14. The laminated glass 10 according to the first embodiment is applicable, for example, to fixed windows of vehicles such as windshields, rear windows, rear quarter windows, roof windows and rear extra windows. The laminated glass 10 according to the first embodiment is applicable even to side windows, so long as they are fixed windows not going up and down.

The laminated glass 10 may be flat or may be double curved such that it is curved both in longitudinal and lateral directions. Otherwise, the laminated glass 10 may be single curved such that it is curved only in a longitudinal direction or in a lateral direction. In a case where the laminated glass 10 is curved, the laminated glass 10 is curved preferably convexly toward the vehicle exterior side.

The glass plate 11 is a vehicle interior side glass plate to be on the vehicle interior side when the laminated glass 10 is attached to a vehicle. The glass plate 12 is a vehicle exterior side glass plate to be on the vehicle exterior side when the laminated glass 10 is attached to a vehicle.

In a case where the laminated glass 10 is curved, the radius of curvature of the laminated glass 10 is preferably 1,000 mm or more and 100,000 mm or less. The radii of curvature of the glass plate 11 and the glass plate 12 may be the same or different. In a case where the radii of curvature of the glass plate 11 and the glass plate 12 are different, the radius of curvature of the glass plate 11 is larger than that of the glass plate 12.

The glass plate 11 and the glass plate 12 are a pair of facing glass plates. The interlayer 13 is disposed between the glass plates as a pair. The glass plate 11 and the glass plate 12 are fixed in a state where they sandwich the interlayer 13. When the vehicle window structure has a single plate glass, the single plate glass may be either the glass plate 11 or the glass plate 12, and no interlayer 13 has to be disposed.

The interlayer 13 is a film to bond the glass plate 11 and the glass plate 12. The outer periphery of the interlayer 13 is preferably subjected to edge treatment. That is, the edge of the interlayer 13 is treated so as not to significantly protrude from the edges of the glass plates 11 and 12. Extrusion of the edge of the interlayer 13 from the edges of the glass plates 11 and 12 is preferably 150 μm or less so as not to impair the outer appearance. Details of the glass plate 11, the glass plate 12 and the interlayer 13 will be described later.

The shielding layer 14 is an opaque layer and may be provided, for example, in a strip shape along the peripheral portions (the upper edge portion $10_1$, the lower edge portion $10_2$, the left edge portion $10_3$ and the right edge portion $10_4$) on the surface on the vehicle interior side of the laminated glass 10. The shielding layer 14 is an opaque (for example black) colored ceramic layer. The shielding layer 14 may be a colored interlayer having light shielding property, a colored film, or a combination of a colored interlayer and a colored ceramic layer. The colored film may be united with e.g. an infrared reflecting film.

By the laminated glass 10 having an opaque shielding layer 14, deterioration of the urethan adhesive 32, etc. to hold the peripheral portion of the laminated glass 10 on the vehicle body by ultraviolet rays can be suppressed. Further, bus bars and electrodes electrically connected to the light emitting device 20 can be shielded so as not to readily be visually recognized from the vehicle exterior side and/or the vehicle interior side.

The shielding layer 14 may be formed, for example, by applying a ceramic color paste containing fusible glass frit containing a black pigment on the glass plate e.g. by screen printing and firing, but its production is not limited thereto. The shielding layer 14 may be formed, for example, by applying an organic ink containing a black or deep color pigment on the glass plate e.g. by screen printing, followed by drying.

In the example shown in FIGS. 1(a) and 1(b), the shielding layer 14 is provided only at the peripheral portion on the surface on the vehicle interior side of the glass plate 11. However, the shielding layer 14 may be provided only at the peripheral portion on the surface on the vehicle interior side of the glass plate 12, or may be provided both at the peripheral portion on the surface on the vehicle interior side of the glass plate 11 and at the peripheral portion on the surface on the vehicle interior side of the glass plate 12.

Between the shielding layer 14 of the laminated glass 10 and the body flange 33 of the vehicle, a dam rubber 31 is disposed, and the laminated glass 10 and the body flange 33 are bonded by the urethane adhesive 32 located on the periphery of the laminated glass 10 than the dam rubber 31, whereby the peripheral portion of the laminated glass 10 is held on the vehicle body. Further, so as to increase the design property from the vehicle interior side, the interior material 34 of the vehicle is provided to cover the peripheral portion of the laminated glass 10, the dam rubber 31, the urethane adhesive 32 and the body flange 33. Thus, between the surface on the vehicle interior side of the laminated glass 10, the urethane adhesive 32 and the interior material 34, a space S is formed.

The space S is, as narrowly defined, a space surrounded by the laminated glass 10, the urethane adhesive 32, the body flange 33 and the interior material 34. In a case where there is a space between the body flange 33 and the interior material 34, the body flange 33 may be virtually extended toward the interior material 34 side, and in a case where there is a space between the laminated glass 10 and the interior material 34, the interior material 34 may be virtually extended toward the laminated glass 10 side to define the outline of the space S as narrowly defined.

The dam rubber 31 is a spacer to define the distance between the laminated glass 10 and the body flange 33 and also functions as a dam to prevent the urethane adhesive 32 before curing from flowing out. The material of the dam rubber 31 may, for example, be polyethylene or ethylene-propylene-diene rubber. The dam rubber 31 is disposed in the space S, however, disposition of the dam rubber 31 is not essential, and the dam rubber 31 is disposed when required.

The light emitting device 20 is a device to emit light inside the vehicle, and has a plurality of light emitting elements 21 and a light guide material 22. The light emitting device 20 makes one or more light emitting elements 21 emit light and guides the emitted light toward the light guide material 22 to display information, alert, etc. In a case where the driving own vehicle is approaching another driving vehicle, the driver may be alerted by lighting or flashing of a predetermined number of the light emitting elements 21. The light emitting device 20 may be used e.g. as a room lamp or an ultraviolet disinfection lamp.

The light emitting elements 21 may be disposed at one or more of the upper edge portion $10_1$, the lower edge portion $10_2$, the left edge portion $10_3$ and the right edge portion $10_4$ of the laminated glass 10, and according to the present embodiment, as an example, the light emitting elements 21 are arranged in a line at redetermined intervals along the lower edge portion $10_2$, the left edge portion $10_3$ and the right edge portion $10_4$. However, so long as no other member such as a camera is disposed and the light emitting elements 21 can be disposed at the upper edge portion $10_1$, as the case requires, the light emitting elements 21 may be disposed at the upper edge portion $10_1$.

At least a part of the light emitting device 20 is disposed in the space S. According to the present embodiment, the light emitting elements 21 and the light guide material 22 are fixed to the laminated glass 10, and the entire light emitting elements 21 and a part of the light guide material 22 are disposed in the space S. When the laminated glass 10 is viewed two-dimensionally, the light emitting elements 21 are disposed preferably at a position overlapping with the shielding layer 14, whereby they can be shielded from outside.

The light emitting elements 21 are mounted, for example, on a substrate, and the substrate is fixed to the shielding layer 14 e.g. with an adhesive. The substrate is made of e.g. polyethylene terephthalate, polyethylene naphthalate, polyaniline, polythiophene, carbon nanotubes or graphene. However, the light emitting elements 21 may be fixed directly to the shielding layer 14 e.g. with an adhesive, without using a substrate. The luminescent color of the light emitting elements 21 is not particularly limited and may, for example, be red, green, blue, yellow or white. The light emitting device 20 may have a plurality of light emitting elements 21 differing in the luminescent color.

The light emitting elements 21 are, for example, LED (light emitting diode). The light emitting elements 21 may also be organic EL (organic electro-luminescence) or inorganic EL (inorganic electro-luminescence). LED here includes micro LED. The light emitting elements 21 may also be hot cathode fluorescent lamp (HCFL) or cold cathode fluorescent lamp (CCFL), or incandescent lamp.

The shape of the light emitting elements 21 is not particularly limited and may, for example, be cuboid. In a case where the light emitting elements 21 are cuboid, their dimensions may, for example, be such that 1.0 mm in length×0.5 mm in width×0.2 mm in height, 1.6 mm in length×0.8 mm in width×0.3 mm in height, 3.2 mm in length×2.0 mm in width×1.0 mm in height, and the like.

In a case where the light emitting elements 21 are LED, the shape of the light emitting elements 21 may, for example, be such that the length is 0.1 mm or more and 3.2 mm or less, the width is 0.1 mm or more and 2.0 mm or less, and the height is 0.1 mm or more and 1.0 mm or less. In a case where the light emitting elements 21 are micro LED, the shape of the light emitting elements 21 is such that both the length and the width are 100 μm or less, preferably 50 μm or less, more preferably 20 μm or less. The lower limits of the length and the width of the micro LED are preferably 3 μm or more in view of production conditions, particularly in order to decrease the edge effect. The height of the micro LED is 10 μm or more and 50 μm or less.

Further, a tape-shaped structure (for example tape LED or line LED) formed by a plurality of the light emitting elements 21 preliminary disposed at predetermined intervals as a whole may also be used.

The light guide material 22 is disposed on the surface center side on the vehicle interior side of the laminated glass 10 relative to the light emitting elements 21, for example, so as to be in contact with the light emitting elements 21, at each of the lower edge portion $10_2$, the left edge portion $10_3$ and the right edge portion $10_4$. The light guide material 22 illuminates a part or the whole of the lower edge portion $10_2$, the left edge portion $10_3$ and the right edge portion $10_4$ of the laminated glass 10, by guiding and giving light emitted from the light emitting elements 21. The light guide material 22 may, for example, be an elongated sheet integrated with the plurality of the light emitting elements 21. The light guide material 22 may, for example, be directly printed on the laminated glass 10.

A part of the light guide material 22 is disposed in the space S, and the other part protrudes out of the space S. When the laminated glass 10 is viewed two-dimensionally, the light guide material 22 is preferably disposed at a position overlapping with the shielding layer 14, whereby it can be shielded from outside. The edge of the light guide material 22, on the surface center side on the vehicle interior side of the laminated glass 10, may extend to a position overlapping with the edge of the shielding layer 14, on the interior side of the laminated glass 10, as viewed two dimensionally. The larger the region of the light guide material 22 protruding from the space S toward the inside of the laminated glass 10, the more the light emitted from the light emitting elements 21 can be visually recognized from the vehicle interior side.

As the light guide material 22, for example, an injection molded light guide may be used. The injection molded light guide is one obtained by injection molding a transparent resin material such as an acrylic resin, polycarbonate, polyethylene terephthalate or urethane, and light emission manner of e.g. prism manner, blast manner or dot manner may optionally be selected. Further, as the light guide material 22, a known optical fiber light guide or liquid light guide may also be used.

Instead of the light guide material 22 or in addition to the light guide material 22, a reflecting material which reflects light given from the light emitting elements 21 and/or the light guide material 22 or a diffusing material which diffuses light given from the light emitting elements 21 and/or the light guide material 22 may be disposed in the space S, at least in a part or entirely. That is, the light emitting device 20 may have, in addition to the light emitting elements 21, an optical member containing at least one of the light guide material 22, a reflecting material and a diffusing material. The reflecting material or the diffusing material may be disposed on the laminated glass 10 side, or may be disposed on the light emitting elements 21 side surface of the dam rubber 31, the light emitting elements 21 side surface of the body flange 33 or on the light emitting elements 21 side surface of the interior material 34. The reflecting material may, for example, be a member containing titania or zirconia. The reflecting material may be a white colored ceramic layer. The diffusing material may, for example, be a member containing fine particles of titanium oxide or coated mica, a member having its surface blasted, or a member having minute protrusions and recesses each functioning as a lens.

The reflecting material and/or the diffusing material may be formed of a transparent material. In a case where a reflecting material and/or a diffusing material formed of a transparent material is disposed on the laminated glass 10 side, the reflecting material and/or the diffusing material does not necessarily have to entirely overlap with the shielding layer 14 as viewed two dimensionally. For example, the reflecting material and/or the diffusing material on the vehicle interior side of the laminated glass 10 may extend to the center side than the shielding layer 14 when the laminated glass 10 is viewed two dimensionally, whereby light emitted from the light emitting elements 21 can readily reach the vehicle interior side while the field of view as a vehicle window is secured.

As described above, in the vehicle window structure 1, at least a part of the light emitting device 20 is disposed in the space S formed between the laminated glass 10, the urethane adhesive 32 and the interior material 34. By effectively utilizing the space S which has not been actively used, the light emitting device 20 can be disposed at a position hardly visually recognized from the vehicle interior side and the vehicle exterior side.

In a conventional embodiment such that the light emitting device is sealed in the interlayer of the laminated glass, for example, if cracks are made in the glass plate in production of the laminated glass or if the light emitting device has a malfunction, the whole laminated glass is unusable. Whereas when the light emitting device 20 is disposed outside the laminated glass 10 (the opposite side of the glass plate 11 from the interlayer 13 or the opposite side of the glass plate 12 from the interlayer 13), as in the present embodiment, if the light emitting device has a malfunction for example, only the light emitting device has to be exchanged, whereby the production efficiency can be improved, thus contributing to reduction of the production cost. The same applies after entry of the products into market, and for example, if the laminated glass attached to a vehicle is broken e.g. by a flying stone, only the laminated glass has to be exchanged, and if the light emitting device is broken, only the light emitting device can readily be changed, and thus good maintenance property will be achieved.

Now, the glass plate 11, the glass plate 12 and the interlayer 13 will be described in detail below.

[Glass Plate]

The glass plates 11 and 12 may be made of either inorganic glass or organic glass. As the inorganic glass, for example, soda lime glass, aluminosilicate glass, borosilicate glass, alkali free glass or quartz glass may be used without any particular restriction. The glass plate 12 located on the vehicle exterior side of the laminated glass 10 is preferably made of inorganic glass from the viewpoint of scratch resistance, preferably soda lime glass from the viewpoint of forming property. In a case where the glass plate 11 and the glass plate 12 are made of soda lime glass, clear glass, green glass containing iron contents in a predetermined amount or more, or UV cut green glass may suitably be used.

The inorganic glass may be either non-tempered glass or tempered glass. Non-tempered glass is one obtained by forming molten glass into a plate, followed by annealing. Tempered glass may be one having a compression stress layer formed on the surface of non-tempered glass.

Tempered glass may be either physically tempered glass such as air-tempered glass or chemically tempered glass. In a case where the tempered glass is physically tempered glass, the glass surface can be tempered by forming a compression stress layer on the glass surface by a temperature difference between the glass surface and the glass interior by operation other than annealing, such as quenching a glass plate uniformly heated in bending, from a temperature in the vicinity of the softening point.

In a case where the tempered glass is chemically tempered glass, for example, the glass surface can be tempered, for example, after bending, by forming compression stress on the glass surface e.g. by ion exchange method. Otherwise, as inorganic glass, glass which absorbs ultraviolet rays or infrared rays may be used. Further, the inorganic glass is preferably transparent, but a colored glass plate to such an extent not to impair transparency may be used.

As the material of the organic glass, polycarbonate, an acrylic resin such as polymethyl methacrylate, or a transparent resin such as polyvinyl chloride or polystyrene may, for example, be mentioned.

As the glass plate, the glass plates 11 and 12 are comprehensively described above, however, the glass plates 11 and 12 may be different glass plates. For example, one of them may be made of inorganic glass and the other organic glass, and one of them may be made of tempered glass and the other non-tempered glass. The glass plates 11 and 12 may be a combination of various glass plates other than the exemplified ones.

The glass plates 11 and 12 are not particularly limited to cuboid, and may be processed into various shape and curvature. For bending the glass plates 11 and 12, gravity forming, pressing or roller forming may, for example, be employed. The method of forming the glass plates 11 and 12 is not particularly limited and for example, in the case of inorganic glass, a glass plate formed by float process is preferred.

The plate thickness of the glass plate 12 is preferably 1.1 mm or more and 3 mm or less at the thinnest portion. When the plate thickness of the glass plate 12 is 1.1 mm or more, strength such as flying stone resistance is sufficient, and when it is 3 mm or less, the mass of the laminated glass 10 will not be too large, and such is preferred in view of mileage of the vehicle. The plate thickness of the glass plate 12 is more preferably 1.8 mm or more and 2.8 mm or less at the thinnest portion, further preferably 1.8 mm or more and 2.6 mm or less, further preferably 1.8 mm or more and 2.2 mm or less, even more preferably 1.8 mm or more and 2.0 mm or less.

The plate thickness of the glass plate 11 is preferably 0.3 mm or more and 2.3 mm or less. When the plate thickness of the glass plate 11 is 0.3 mm or more, handling efficiency will be good, and when it is 2.3 mm or less, the mass will not be too large.

The glass plates 11 and 12 may be flat or curved. However, if the glass plates 11 and 12 are curved and the plate thickness of the glass plate 11 is not appropriate, when two significantly bent glass plates are formed as the glass plates 11 and 12, the shapes of the two plates may not match well, and glass quality such as residual stress after bonding may significantly be impaired.

However, when the plate thickness of the glass plate 11 is 0.3 mm or more and 2.3 mm or less, sufficient glass quality such as residual stress may be maintained. A plate thickness of the glass plate 11 of 0.3 mm or more and 2.3 mm or less is particularly effective to maintain glass quality of significantly bent glass plates. The plate thickness of the glass plate 11 is more preferably 0.5 mm or more and 2.1 mm or less, further preferably 0.7 mm or more and 1.9 mm or less. Within such a range, the above effects will be more remarkable.

When the laminated glass 10 is used, for example, for a head-up display, the glass plate 11 and/or 12 may not have a constant plate thickness and may have a non-uniform plate thickness by location as the case requires. For example, in a case where the laminated glass 10 is a windshield, either one or both of the glass plates 11 and 12 may have a wedge cross section such that the plate thickness increases from the lower edge toward the upper edge of the windshield, in a state where the windshield is attached to a vehicle. In such a case, when the film thickness of the interlayer 13 is constant, the total wedge angle of the glass plate 11 and the glass plate 12 varies within a range of more than 0 mrad and 1.0 mrad or less.

The glass plate 11 and/or 12 may have, on the opposite side from the interlayer 13, a coating film having a function such as water repellency, ultraviolet or infrared shielding, or a coating film having low reflection or low emission properties. Further, the glass plate 11 and/or 12 may have, on the side in contact with the interlayer 13, an ultraviolet or infrared shielding, low emission, visible light absorption, or colored coating film.

In a case where the glass plates 11 and 12 are curved inorganic glass plates, the glass plates 11 and 12 are bent after formation by float process and before bonding by the interlayer 13. Bending is carried out by heating and softening the glass. The glass heating temperature at the time of bending is from about 550° C. to about 700° C.

[Interlayer]

For the interlayer 13, a thermoplastic resin is used in many cases, and for example, a thermoplastic resin which has been used for such a type of application, such as a plasticized polyvinyl acetal resin, a plasticized polyvinyl chloride resin, a saturated polyester resin, a plasticized saturated polyester resin, a polyurethane resin, a plasticized polyurethane resin, an ethylene/vinyl acetate copolymer resin, an ethylene/ethyl acrylate copolymer resin, a cycloolefin polymer resin or an ionomer resin may be mentioned. Further, a resin composition containing a modified block copolymer hydride disclosed in Japanese Patent No. 6065221 may also be suitably used.

Among them, in view of excellent balance of various performances such as transparency, weather resistance, strength, adhesion, penetration resistance, impact energy absorption property, moisture resistance, heat shielding property and sound insulating property, a plasticized polyvinyl acetal resin is suitably used. Such a thermoplastic resin may be used alone or in combination of two or more. "Plasticized" in the plasticized polyvinyl acetal resin means being plasticized by addition of a plasticizer. The same applies to the other plasticized resins.

However, in a case where a specific object is sealed in the interlayer 13, the object may be deteriorated by a specific plasticizer depending upon its type, and in such a case, it is preferred to use a resin containing substantially no such a plasticizer. That is, the interlayer 13 preferably contains no plasticizer in some cases. The resin containing no plasticizer may, for example, be an ethylene/vinyl acetate copolymer resin.

The polyvinyl acetal resin may be a polyvinyl formal resin obtained by reacting polyvinyl alcohol (hereinafter sometimes referred to as "PVA" as the case requires) and formaldehyde, a narrowly defined polyvinyl acetal resin obtained by reacting PVA and acetaldehyde, a polyvinyl butyral resin obtained by reacting PVA and n-butyraldehyde (hereinafter sometimes referred to as "PVB" as the case requires), or the like. Particularly in view of excellent balance of various performances such as transparency, weather resistance, strength, adhesion, penetration resistance, impact energy absorbing property, moisture resistance, heat shielding property and sound insulating properties, PVB is mentioned as a preferred polyvinyl acetal resin. Such a polyvinyl acetal resin may be used alone or in combination of two or more.

However, the material forming the interlayer 13 is not limited to a thermoplastic resin. The interlayer 13 may contain functional particles of an infrared absorbing agent, an ultraviolet absorbing agent or a light emitting agent. Further, the interlayer 13 may have a colored portion called a shade band (region having a function to decrease visible light transmittance). The coloring pigment to be used for forming the colored portion is not particularly limited so long as it can be used for plastic and it achieves a visible light transmittance of the colored portion of 40% or less, and for example, an azo, phthalocyanine, quinacridone, perylene, perinone, dioxazine, anthraquinone or isoindolinone organic coloring pigment or an inorganic coloring pigment such as an oxide, a hydroxide, a sulfide, a chromate, a sulfate, a carbonate, a silicate, a phosphate, an arsenate, a ferrocyanide, carbon or a metal powder may be mentioned. Such a coloring pigment may be used alone or in combination of two or more. The amount of the coloring pigment added may be optional depending upon the desired color and is not particularly limited so long as a visible light transmittance at the colored portion of 40% or less is achieved.

The film thickness of the interlayer 13 is preferably 0.5 mm or more at the thinnest portion. In a case where the interlayer 13 comprises a plurality of layers, the film thickness of the interlayer 13 means the total of the film thicknesses of the respective layers. When the film thickness of the interlayer 13 at the thinnest portion is 0.5 mm or more, sufficient impact resistance as the laminated glass will be achieved. Further, the film thickness of the interlayer 13 is preferably 3 mm or less at the thickest portion. When the maximum value of the film thickness of the interlayer 13 is 3 mm or less, the mass of the laminated glass may not be too large. The maximum value of the film thickness of the interlayer 13 is more preferably 2.8 mm or less, further preferably 2.6 mm or less.

When the laminated glass 10 is used, for example, for a head-up display, the interlayer 13 may not have a constant film thickness and may have a non-uniform film thickness by location as the case requires. For example, in a case where the laminated glass 10 is a windshield, the interlayer 13 may have a wedge cross section such that the film thickness increases from the lower edge toward the upper edge of the windshield, in a state where the windshield is attached to a vehicle. In such a case, when the plate thicknesses of the glass plates 11 and 12 are constant, the wedge angle of the interlayer 13 varies within a range of more than 0 mrad and 1.0 mrad or less.

The interlayer 13 may have three or more layers. For example, by the interlayer having three or more layers such that the elastic modulus in shear of any layer excluding both the outermost side layers is smaller than the elastic moduli in shear of both the outermost side layers, the sound insulating properties of the laminated glass 10 can be improved. In such a case, the elastic moduli in shear of both the outermost side layers may be the same or different.

In a case where the interlayer 13 comprises a plurality of layers, the respective layers are preferably formed of the same material, but may be formed of different materials. From the viewpoint of adhesion between the glass plates 11 and 12, the functional material sealed in the laminated glass 10, it is preferred to use the above material for 50% or more of the film thickness of the interlayer 13.

To prepare the interlayer 13, for example, the above resin material for forming the interlayer may be properly selected and subjected to extrusion in a heated molten state by an extruder. The extrusion conditions such as the extrusion rate of the extruder are set to be constant. The extruded resin film is elongated as the case requires, so that the upper and lower edges have curvature in accordance with the design of the laminated glass, whereby the interlayer 13 is completed.

[Laminated Glass]

The total thickness of the laminated glass 10 is preferably 2.8 mm or more and 10 mm or less. When the total thickness of the laminated glass 10 is 2.8 mm or more, sufficient stiffness can be secured. Further, when the total thickness of the laminated glass 10 is 10 mm or less, a sufficient transmittance will be obtained and the haze can be reduced at the same time.

The slippage between the glass plate 11 and the glass plate 12 at one side or more of the laminated glass 10, is preferably 1.5 mm or less, more preferably 1 mm or less. The slippage between the glass plate 11 and the glass plate 12 is the amount of slippage between the edge of the glass plate 11 and the edge of the glass plate 12 as viewed two-dimensionally.

The slippage between the glass plate 11 and the glass plate 12 at one side or more of the laminated glass 10 is preferably 1.5 mm or less, in that the outer appearance will not be impaired. The slippage between the glass plate 11 and the glass plate 12 at one side or more of the laminated glass 10 is preferably 1.0 mm or less, in that the outer appearance will not be impaired.

To produce the laminated glass 10, the interlayer 13 is sandwiched between the glass plate 11 and the glass plate 12 to form a laminate. The laminate is put, for example, in a plastic bag or a rubber chamber, or a resin bag, and bonded in vacuum under a gauge pressure of −65 kPa to −100 kPa at a temperature of from about 70° C. to about 110° C. The heating conditions, the temperature conditions and the laminate method are properly selected.

Further, for example, by contact bonding treatment of heat pressing the laminate at a temperature of from 100° C. to 150° C. under a pressure of from 0.6 MPa to 1.3 MPa, a laminated glass 10 with more excellent durability can be obtained. However, considering simplification of the process and properties of the material to be sealed in the laminated glass 10, in some cases, the heat pressing step may not be employed.

That is, a method called "cold bending" may be employed such that the glass plate 11 and the glass plate 12 are bonded in a state where either one or both of the glass plates underwent elastic deformation. Cold bending may be conducted by using a laminate of the glass plate 11, the glass plate 12 and the interlayer 13 fixed by a temporary fixing means such as a tape, a known preliminary contact bonding apparatus such as a nip roller, a plastic bag or a rubber chamber, and an autoclave.

The laminate may have, between the glass plate 11 and the glass plate 12, in addition to the interlayer 13, within a range not to impair the effects of the present invention, a film or a device having a function of heating wire, infrared reflection, light emitting, photoelectric, light control, touch panel, visible light reflection, scattering, decoration, absorption, etc. Further, the laminated glass 10 may have, on its surface, a film having a function of e.g. antifogging, water repellency, heat shielding, low reflection, etc. Further, the laminate may have, on the surface on the vehicle exterior side of the glass plate 11 or on the surface on the vehicle interior side of the glass plate 12, a film having a function of e.g. heat shielding or heat generation.

Modified Example of First Embodiment

As a modified example of the first embodiment, an example of a vehicle window structure differing in the manner of attachment of the light emitting device from the first embodiment will be shown. In the modified example of the first embodiment, description regarding the same constituents as those in the embodiment already described may sometimes be omitted.

Figure 2A:
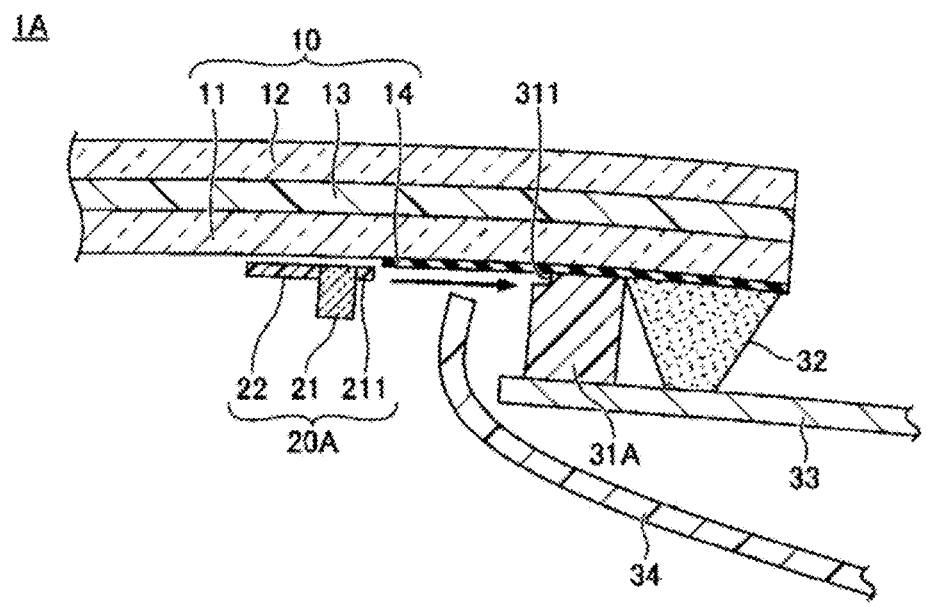
FIGS. 2(a) to 2(c) are views illustrating a vehicle window structure according to modified example 1 of the first embodiment.
Figure 2B:
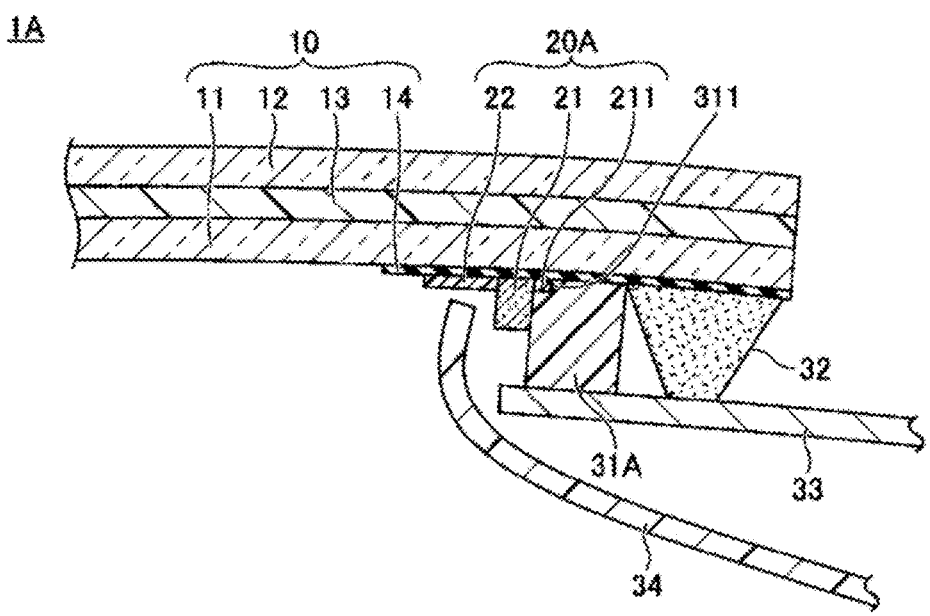
Figure 2C:
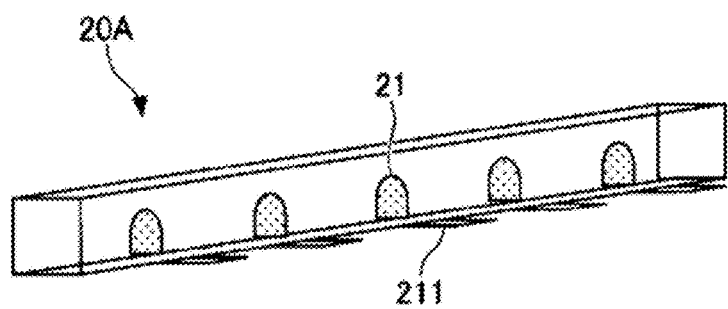

FIG. 2(a) is a cross sectional view illustrating a vehicle window structure according to modified example 1 of the first embodiment (before attachment of the light emitting device) and illustrates a cross section corresponding to FIG. 1(b). FIG. 2(b) is a cross sectional view illustrating a vehicle window structure according to modified example 1 of the first embodiment (after attachment of the light emitting device) and illustrates a cross section corresponding to FIG. 1(b). FIG. 2(c) is a perspective view illustrating the vicinity of the light emitting elements of the light emitting device.

As shown in FIGS. 2(a) to 2(c), the vehicle window structure 1A of modified example 1 has a laminated glass 10 and a light emitting device 20A. The light emitting device 20A is the same as the light emitting device 20 with respect to the light emitting elements 21 and the light guide material 22, but is different from the light emitting device 20 in that convex attachment terminals 211 are provided on the opposite side of the light emitting elements 21 from the light guide material 22. The same number of the attachment terminals 211 may be provided as the number of the light emitting elements 21, but the number is not limited thereto.

Further, instead of the dam rubber 31, a bracket 31A is provided. The bracket 31A is in contact with the laminated glass 10 and the body flange 33. The bracket 31A functions as a spacer to specify the distance between the laminated glass 10 and the body flange 33 and plays a role as a dam to prevent the urethane adhesive 32 before curing from flowing out. The bracket 31A has concave attachment terminals 311, and when the attachment terminals 211 of the light emitting elements 21 are inserted to the attachment terminals 311, they mate with each other and the light emitting device 20A is thereby fixed to the bracket 31A. By such a structure, the light emitting device 20A is removable from the bracket 31A. For example, if the light emitting device 20A is broken, it can readily be exchanged.

Further, such is also employed that the attachment terminals 211 and 311 are respectively male connectors and female connecters and when they are bonded, wirings provided in the light emitting device 20A and the bracket 31A are electrically connected.

Figure 3A:
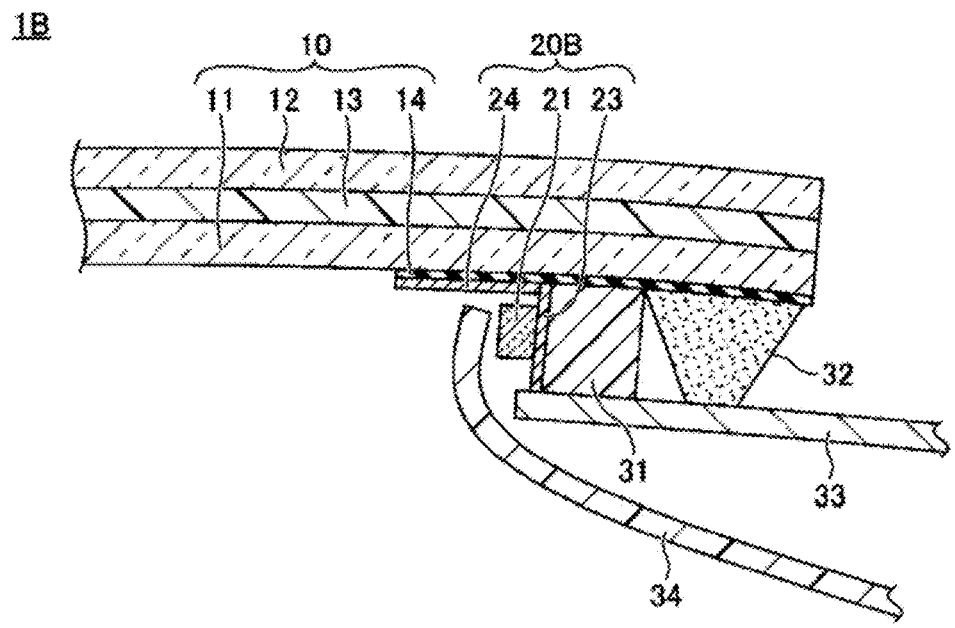
FIGS. 3(a) to 3(c) are views illustrating a vehicle window structure according to modified examples 2 and 3 of the first embodiment.

FIG. 3(a) is a cross sectional view illustrating a vehicle window structure according to modified example 2 of the first embodiment, and illustrate a cross section corresponding to FIG. 1(b).

As shown in FIG. 3(a), the vehicle window structure 1B according to modified example 2 has a laminated glass 10 and a light emitting device 20B. The light emitting device 20B has light emitting elements 21 mounted on a substrate 23 and a reflecting material 24. The substrate 23 is fixed to the side surface facing the vehicle interior side of the dam rubber 31 e.g. with an adhesive. Further, the light emitting elements 21 may directly be fixed to the side surface facing the vehicle interior side of the dam rubber 31, without providing the substrate 23. Otherwise, instead of the light emitting elements 21, a light emitting part having light emitting elements and a light guide material integrated, may be fixed to the side surface facing the vehicle interior side of the dam rubber 31. Light emitted from the light emitting elements 21 is reflected on the reflecting material 24 and becomes visually recognized from the vehicle interior side. The same effects will be obtained by providing a diffusing material instead of the reflecting material 24.

Figure 3B:
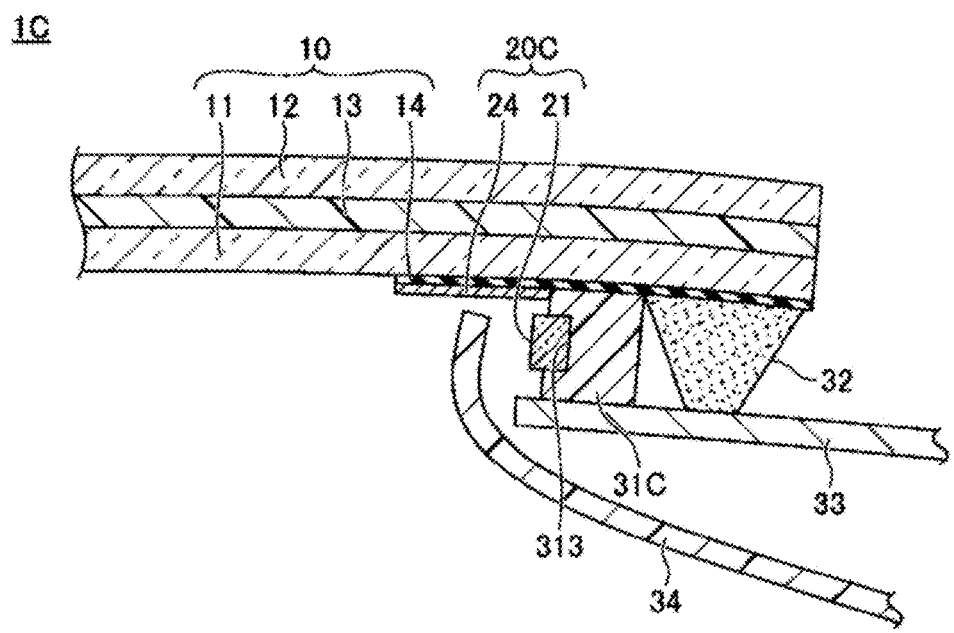
Figure 3C:
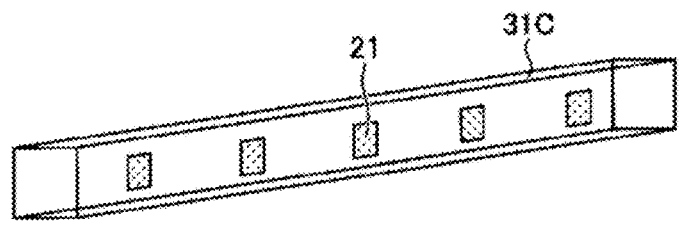

FIG. 3(b) is a cross sectional view illustrating a vehicle window structure according to modified example 3 of the first embodiment, and illustrate a cross section corresponding to FIG. 1(b). FIG. 3(c) is a perspective view illustrating a portion of the light emitting elements of the light emitting device according to modified example 3.

As shown in FIGS. 3(b) and 3(c), the vehicle window structure 1C according to modified example 3 has a laminated glass 10 and a light emitting device 20C. The light emitting device 20C has light emitting elements 21 and a reflecting material 24. The vehicle window structure 1C has a bracket 31C instead of the dam rubber 31, and the light emitting elements 21 are fixed to light emitting element attachment grooves 313 provided on the bracket 31C. The light emitting elements 21 preferably protrude from the surface facing the vehicle interior side of the bracket 31C, with a view to diffusing the light. Instead of the light emitting elements 21, the light emitting element portion of a light emitting part having light emitting elements and a light guide material integrated may be fixed to light emitting element attachment grooves 313 provided on the bracket 31C. Light emitted from the light emitting elements 21 is reflected on the reflecting material 24 and becomes visually recognized from the vehicle interior side. The same effects will be obtained by providing a diffusing material instead of the reflecting material 24.

Figure 4A:
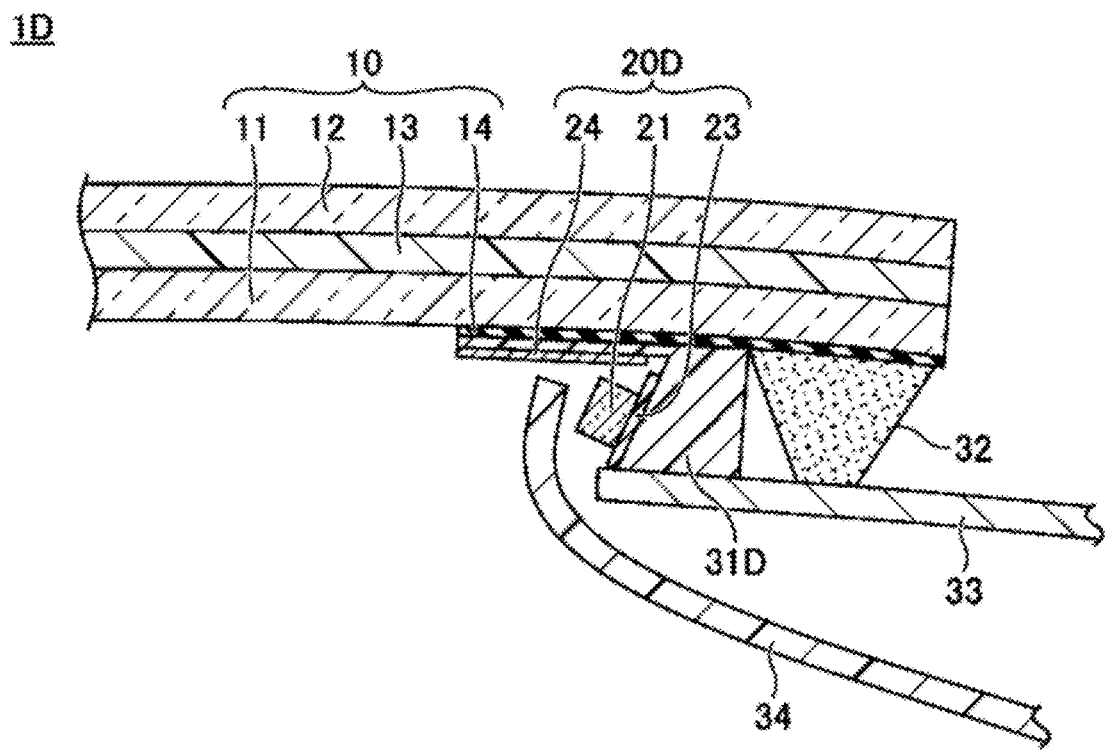
FIGS. 4(a) and 4(b) are cross-sectional views illustrating a vehicle window structure according to modified examples 4 and 5 of the first embodiment.

FIG. 4(a) is a cross sectional view illustrating a vehicle window structure according to modified example 4 of the first embodiment, and illustrate a cross section corresponding to FIG. 1(b).

As shown in FIG. 4(a), a vehicle window structure 1D according to modified example 4 has a laminated glass 10 and a light emitting device 20D. The light emitting device 20D has light emitting elements 21 mounted on a substrate 23 and a reflecting material 24. As in the vehicle window structure 1D, a bracket 31D having an inclined surface facing the vehicle interior side of the laminated glass 10 may be provided instead of the dam rubber 31, and the light emitting elements 21 mounted on the substrate 23 may be fixed to the inclined surface of the bracket 31D e.g. with an adhesive. In the example shown in FIG. 4(a), the bracket 31D has an inclined surface inclined about 20° to the vehicle interior side surface of the laminated glass 10 based on the thickness direction of the laminated glass 10. The light emitting elements 21 may be directly fixed to the inclined surface facing the vehicle interior side of the bracket 31D, without providing the substrate 23. Otherwise, instead of the light emitting elements 21, a light emitting part having light emitting elements and a light guide material integrated may be fixed to the inclined surface facing the vehicle interior side of the bracket 31D. Light emitted from the light emitting elements 21 is reflected on the reflecting material 24 and becomes visually recognized from the vehicle interior side. By adjusting the angle of the inclined surface, light emitted from the light emitting elements 21 can efficiently be reflected to the vehicle interior side. The same effects will be obtained by providing a diffusing material instead of the reflecting material 24.

Figure 4B:
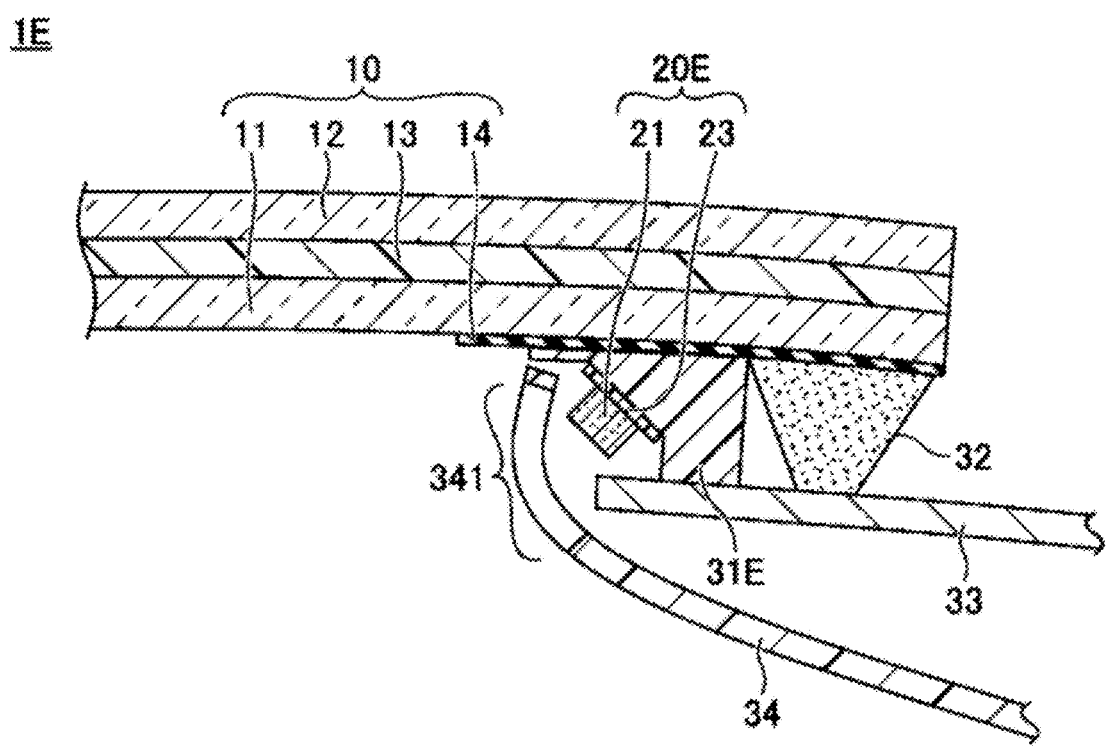

FIG. 4(b) is a cross sectional view illustrating a vehicle window structure according to modified example 5 of the first embodiment and illustrates a cross section corresponding to FIG. 1(b).

As shown in FIG. 4(b), the vehicle window structure 1E according to modified example 5 has a laminated glass 10 and a light emitting device 20E. The light emitting device 20E has light emitting elements 21 mounted on a substrate 23. As in the vehicle window structure 1E, a bracket 31E having an inclined surface facing the interior material 34 side may be provided instead of the dam rubber 31, and the light emitting elements 21 mounted on the substrate 23 may be fixed to the inclined surface of the bracket 31E e.g. with an adhesive. In the example shown in FIG. 4(b), the bracket 31E has an inclined surface inclined about 50° to the vehicle interior side based on the thickness direction of the laminated glass 10. Further, the light emitting elements 21 may be directly fixed to the inclined surface facing the interior material 34 side of the bracket 31E, without providing the substrate 23. Otherwise, instead of the light emitting elements 21, a light emitting part having light emitting elements and a light guide material integrated may be fixed to the inclined surface facing the interior material 34 side of the bracket 31E. Light emitted from the light emitting elements 21 is transmitted through a transmission region 341 provided on the interior material 34 and becomes visually recognized from the vehicle interior side. A function of light guide or diffusion may be added to the transmission region 341 to impart directivity.

As explained above, the inclined surface is inclined a predetermined angle toward the vehicle interior side surface of the laminated glass 10 or the interior material 34 side based on the thickness direction of the laminated glass 10 being 0°. The inclination angle may properly be adjusted to be 5° or more and 85° or less. The inclination angle may be 10° or more, may be 20° or more, may be 30° or more, may be 45° or more. The inclination angle may be 80° or less, may be 70° or less, may be 60° or less, may be 50° or less, may be 45° or less.

Figure 5A:
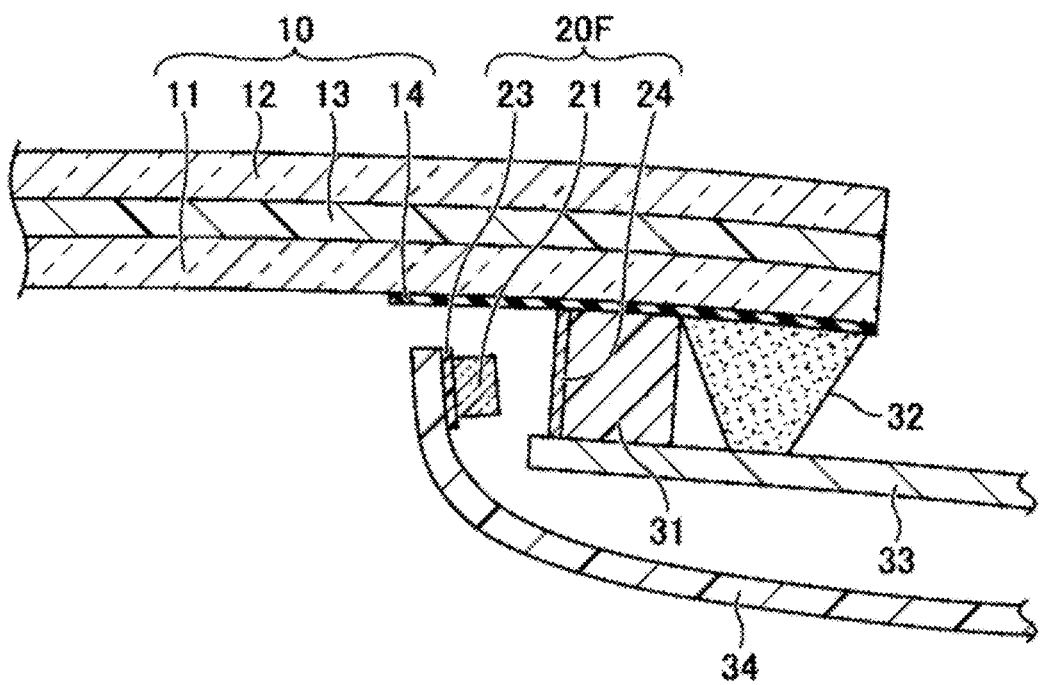
FIGS. 5(a) and 5(b) are cross-sectional views illustrating a vehicle window structure according to modified examples 6 and 7 of the first embodiment.

FIG. 5(a) is a cross sectional view illustrating a vehicle window structure according to modified example 6 of the first embodiment, and illustrates a cross section corresponding to FIG. 1(b).

As shown in FIG. 5(a), a vehicle window structure 1F according to modified example 6 has a laminated glass 10 and a light emitting device 20F. The light emitting device 20F has light emitting elements 21 mounted on a substrate 23 and a reflecting material 24. As in the vehicle window structure 1F, light emitting elements 21 mounted on a substrate 23 may be fixed to a surface facing the dam rubber 31 side of the interior material 34 e.g. with an adhesive. Further, the light emitting elements 21 may be directly fixed to a surface facing the dam rubber 31 side of the interior material 34 without providing the substrate 23. Otherwise, instead of the light emitting elements 21, a light emitting part having the light emitting elements and a light guide material integrated may be fixed to a surface facing the dam rubber 31 side of the interior material 34. Light emitted from the light emitting elements 21 is reflected on the reflecting material 24 provided on a surface facing the vehicle interior side of the dam rubber 31 and becomes visually recognized from the vehicle interior side. The same effects will be obtained by providing a diffusing material instead of the reflecting material 24.

Figure 5B:
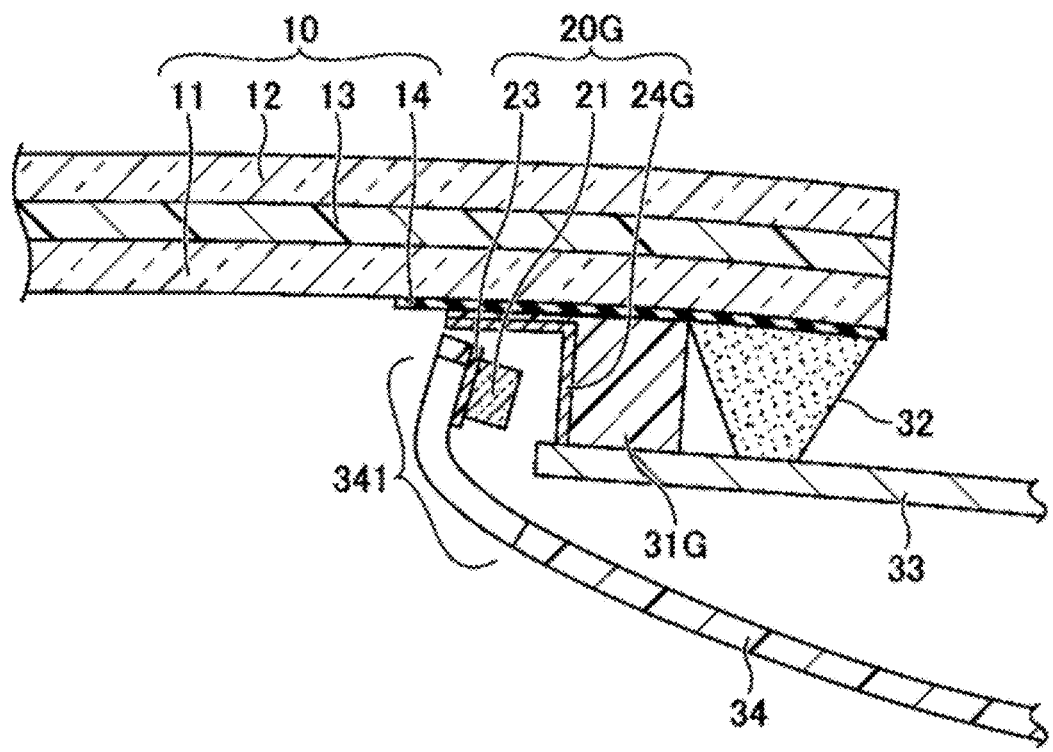

FIG. 5(*b*) is a cross sectional view illustrating a vehicle window structure according to modified example 7 of the first embodiment and illustrates a cross section corresponding to FIG. 1(*b*).

As shown in FIG. 5(*b*), a vehicle window structure 1G according to modified example 7 has a laminated glass 10 and a light emitting device 20G. The light emitting device 20G has light emitting elements 21 mounted on a substrate 23 and a reflecting material 24G. In the vehicle window structure 1G, the bottom side of the dam rubber 31G extends to the interior material 34 side along a shielding layer 14, and on the bottom side of the dam rubber 31G, that is on the extending portion on the laminated glass 10 side and on the side surface on the vehicle interior side of the dam rubber 31G, an L-shaped reflecting material 24G is provided. Light emitted from the light emitting elements 21 is reflected on the L-shaped reflecting material 24G and transmitted through a transmission region 341 provided on the interior material 34 and becomes visually recognized from the vehicle interior side. A function of light guide or diffusion may be added to the transmission region 341 to impart directivity.

Figure 6A:
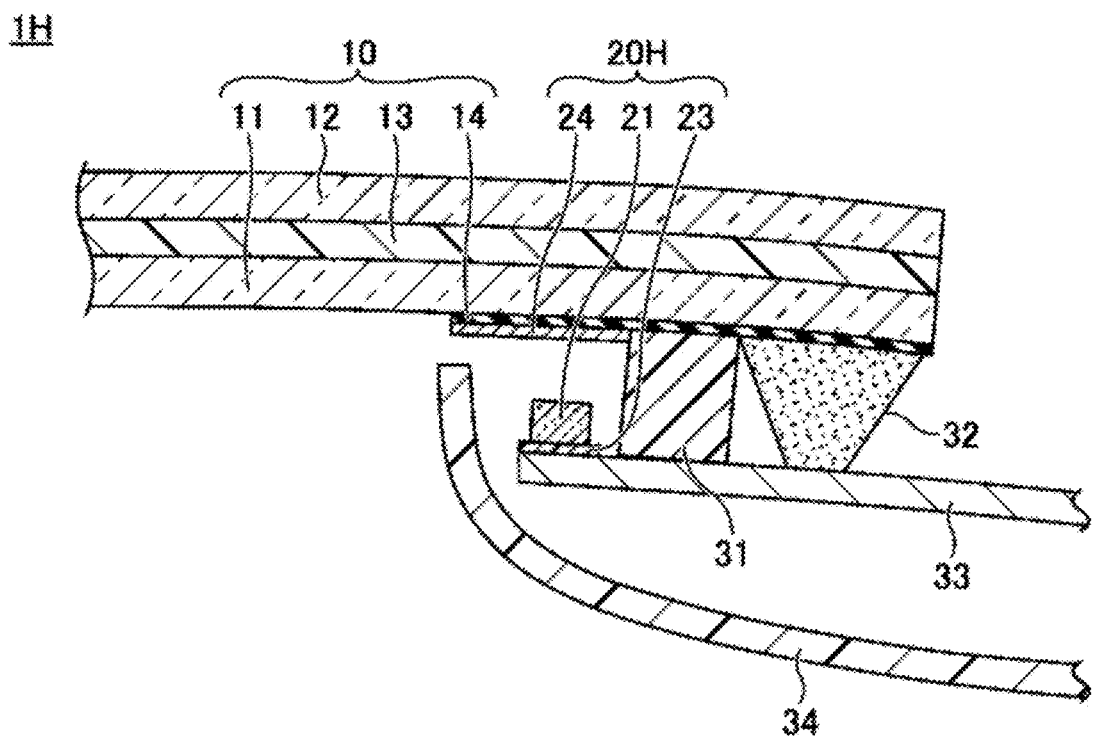
FIGS. 6(a) and 6(b) are cross-sectional views illustrating a vehicle window structure according to modified examples 8 and 9 of the first embodiment.
Figure 6B:
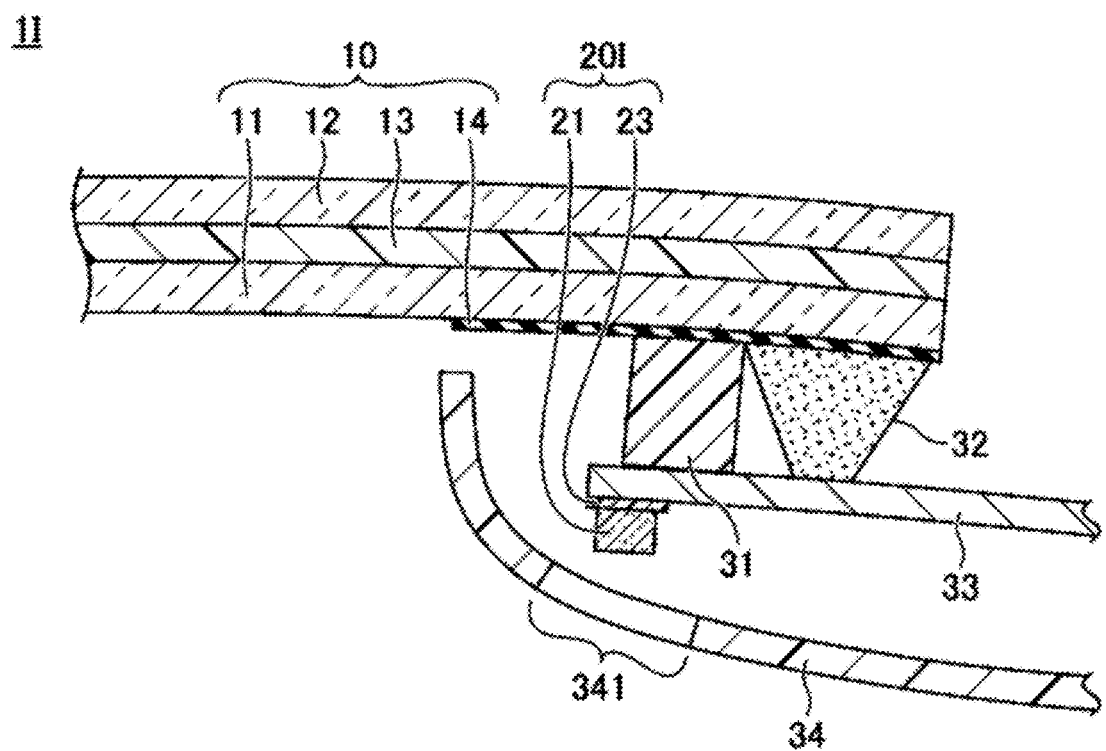

FIG. 6(*a*) is a cross sectional view illustrating a vehicle window structure according to modified example 8 of the first embodiment and illustrates a cross section corresponding to FIG. 1(*b*).

As shown in FIG. 6(*a*), the vehicle window structure 1H according to modified example 8 has a laminated glass 10 and a light emitting device 20H. The light emitting device 20H has light emitting elements 21 mounted on a substrate 23 and a reflecting material 24. As in the vehicle window structure 1H, the light emitting elements 21 mounted on the substrate 23 may be fixed to a surface facing the laminated glass 10 side of the body flange 33 e.g. with an adhesive. Further, the light emitting elements 21 may directly be fixed to a surface facing the laminated glass 10 side of the body flange 33 without providing the substrate 23. Otherwise, instead of the light emitting elements 21, a light emitting part having light emitting elements and a light guide material integrated may be fixed to a surface facing the laminated glass 10 side of the body flange 33. Light emitted from the light emitting elements 21 is reflected on the reflecting material 24 provided on a shielding layer 14 exposed to the vehicle interior side than the dam rubber 31 and becomes visually recognized from the vehicle interior side. The same effects will be obtained by providing a diffusing material instead of the reflecting material 24.

FIG. 6(*b*) is a cross sectional view illustrating a vehicle window structure according to modified example 9 of the first embodiment and illustrates a cross section corresponding to FIG. 1(*b*).

As shown in FIG. 6(*b*), a vehicle window structure 1I according to modified example 9 has a laminated glass 10 and a light emitting device 20I. The light emitting device 20I has light emitting elements 21 mounted on a substrate 23. As in the vehicle window structure 1I, the light emitting elements 21 mounted on the substrate 23 may be fixed to a surface of the body flange 33 facing the opposite side from the laminated glass 10 e.g. with an adhesive. Further, the light emitting elements 21 may be directly fixed to a surface of the body flange 33 facing the opposite side from the laminated glass 10 without providing the substrate 23. Otherwise, instead of the light emitting elements 21, a light emitting part having light emitting elements and a light guide material integrated may be fixed to a surface of the body flange 33 facing the opposite side from the laminated glass 10. Light emitted from the light emitting elements 21 is transmitted through a transmission region 341 provided on the interior material 34 and becomes visually recognized from the vehicle interior side. A function of light guide or diffusion may be added to the transmission region 341 to impart directivity.

Second Embodiment

According to a second embodiment of the present invention, a vehicle window structure in which the position of attachment of the light emitting elements is different from that in the first embodiment, is shown. Description regarding the same constituents as those in the embodiment already described may sometimes be omitted, in the second embodiment.

Figure 7A:
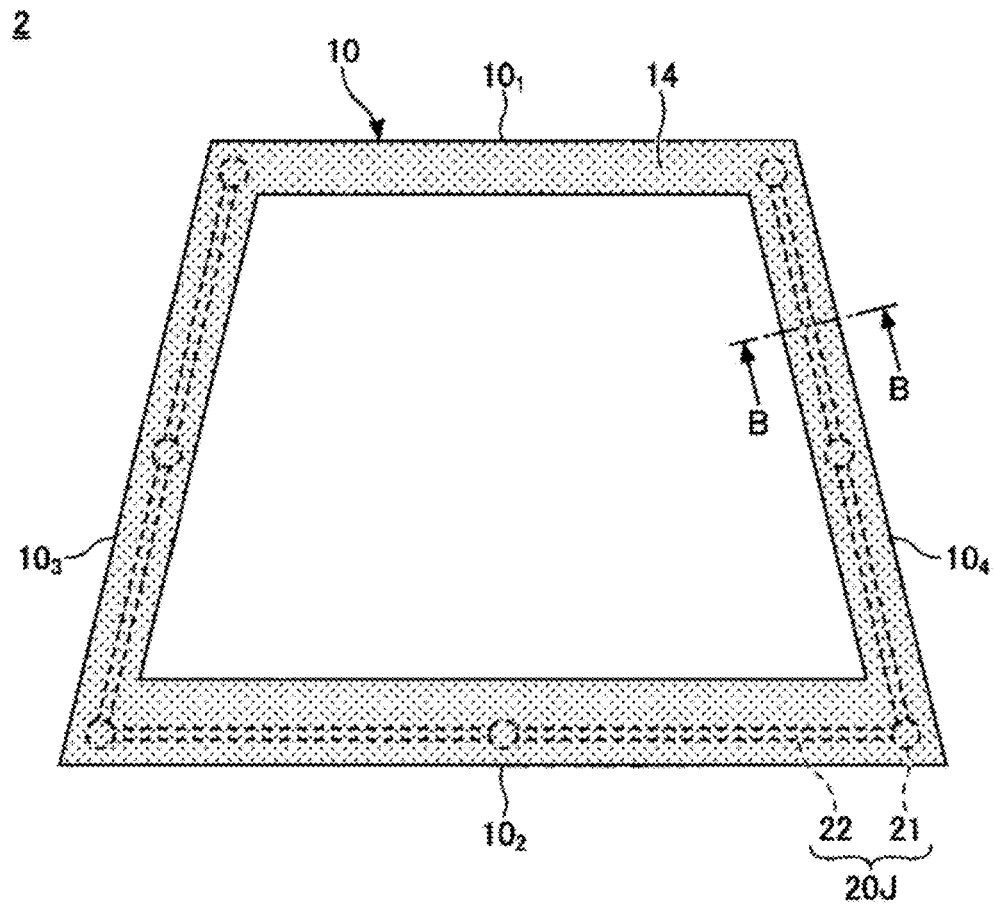
FIGS. 7(a) and 7(b) are cross-sectional views illustrating a vehicle window structure according to a second embodiment of the present invention.
Figure 7B:
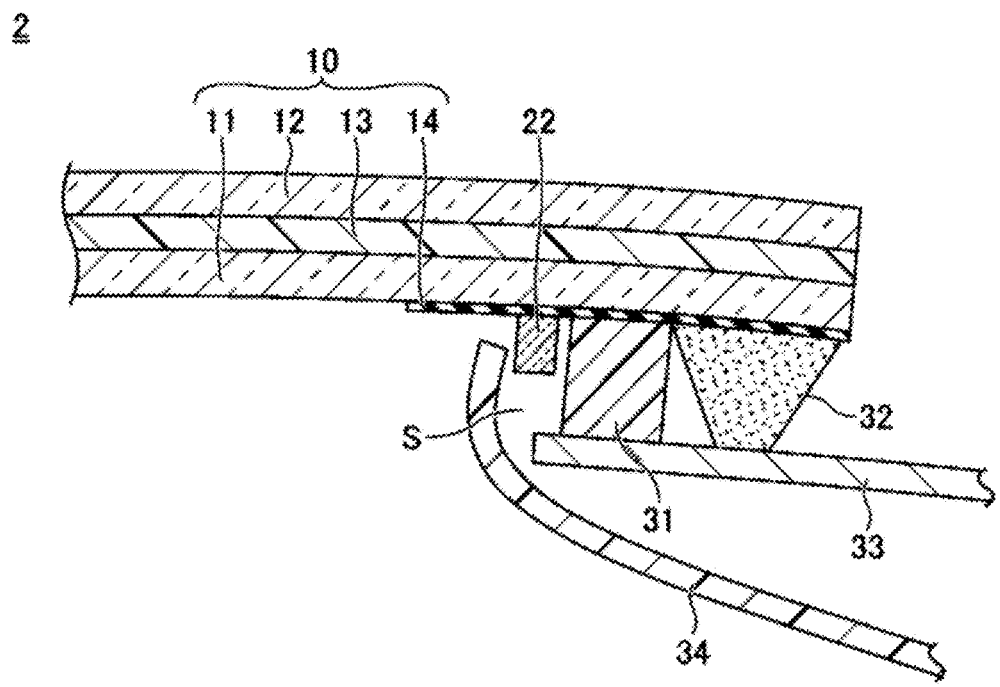

FIGS. 7(*a*) and 7(*b*) are views illustrating the vehicle window structure according to the second embodiment, and FIG. 7(*a*) schematically illustrate a state where the vehicle window structure attached to a vehicle is visually recognized from the vehicle interior side toward the vehicle exterior side. FIG. 7(*b*) is a partially enlarged cross sectional view along the line B-B in FIG. 7(*a*). In FIG. 7(*a*), illustrations of the dam rubber 31, the urethane adhesive 32, etc. illustrated in FIG. 7(*b*) is omitted.

The vehicle window structure 2 according to the second embodiment shown in FIGS. 7(*a*) and 7(*b*) has a light emitting device 20J having light emitting elements 21 and a light guide material 22, and the light emitting elements 21 are disposed at the vicinity of both the edge portions and at the vicinity of the center portion, of each of the lower edge portion $10_2$, the left edge portion $10_3$ and the right edge portion $10_4$. Further, so long as no other member such as a camera is disposed and the light emitting element 21 can be disposed on the upper edge portion $10_1$, the light emitting element 21 may be disposed at the upper edge portion $10_1$ as the case requires. Further, the light emitting elements 21 are not necessarily disposed at the vicinity of both the edge portions and at the vicinity of the center portion of the predetermined edge portions, so long as the light emitting elements 21 and the light guide material 22 are alternately disposed along the predetermined edge portions of the laminated glass 10.

The light guide material 22 is disposed in the space S and makes light emitted from the light emitting elements 21 enter from the edge portion, and guides and gives the light to illuminate a part of or the whole of the lower edge portion $10_2$, the left edge portion $10_3$ and the right edge portion $10_4$ of the laminated glass 10. The light emitting elements 21 may be disposed in the space S. The light guide material 22 may, for example, be a known light guide such as a light guide rod (a rod having a core layer and a cladding layer with a predetermined refractive index difference), glass fibers or a liquid light guide which guides light using a light transmitting liquid core.

As described above, by alternately disposing the light emitting elements 21 and the light guide material 22 along the predetermined edge portions of the laminated glass 10 so that the light guide material 22 guides and gives light emitted from the light emitting elements 21, whereby a part or the whole of the predetermined edge portions of the laminated glass 10 can be illuminated with a small number of the light emitting elements 21. That is, a low cost vehicle window structure can be realized.

In the vehicle window structure 2, in the same manner as the vehicle window structure 1, at least a part of the light emitting device 20J is disposed in the space S formed between the glass plate 11, the dam rubber 21 and the interior material 34. By effectively utilizing the space S which has not been actively used, the light emitting device 20J can be disposed at a position hardly visually recognized from the vehicle interior side. Further, as different from a conventional structure in which the light emitting device is sealed in the interlayer of a laminated glass, in the same manner as the vehicle window structure 1 and the like, the production cost can be reduced, and maintenance of products after entry into the market is excellent.

Modified Example of Second Embodiment

In a modified example of the second embodiment, a vehicle window structure differing in the manner of attachment of the light emitting device from the second embodiment is shown. In the modified example of the second embodiment, description regarding the same constituents as those in the embodiment already described, may sometimes be omitted.

Figure 8A:
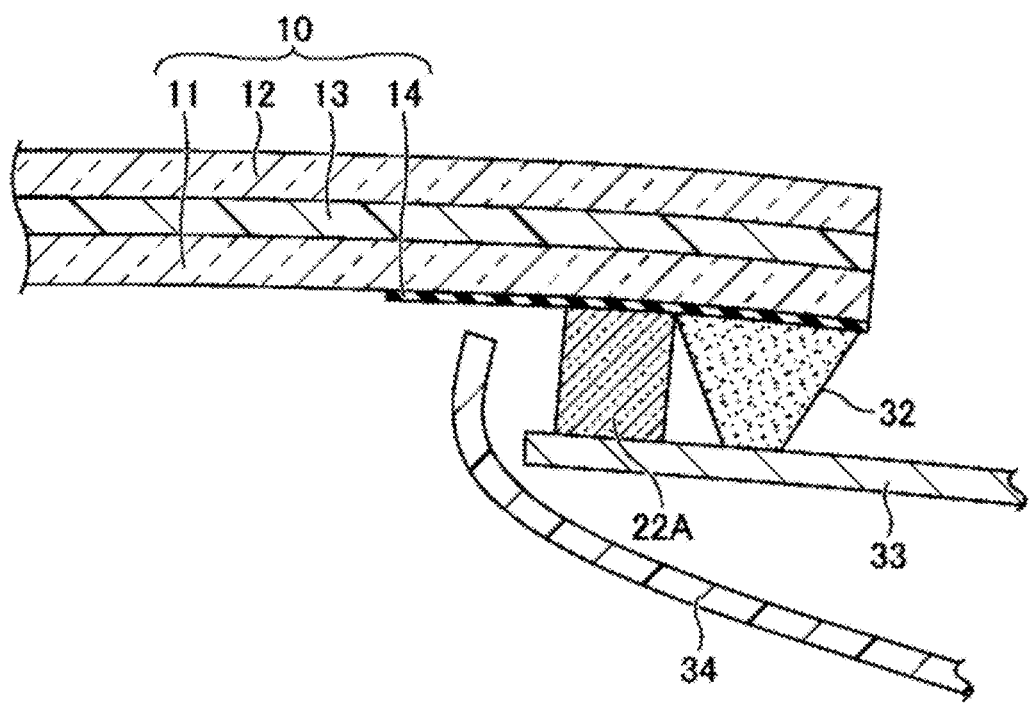
FIGS. 8(a) and 8(b) are cross-sectional views illustrating a vehicle window structure according to modified examples 1 and 2 of the second embodiment.
Figure 8B:
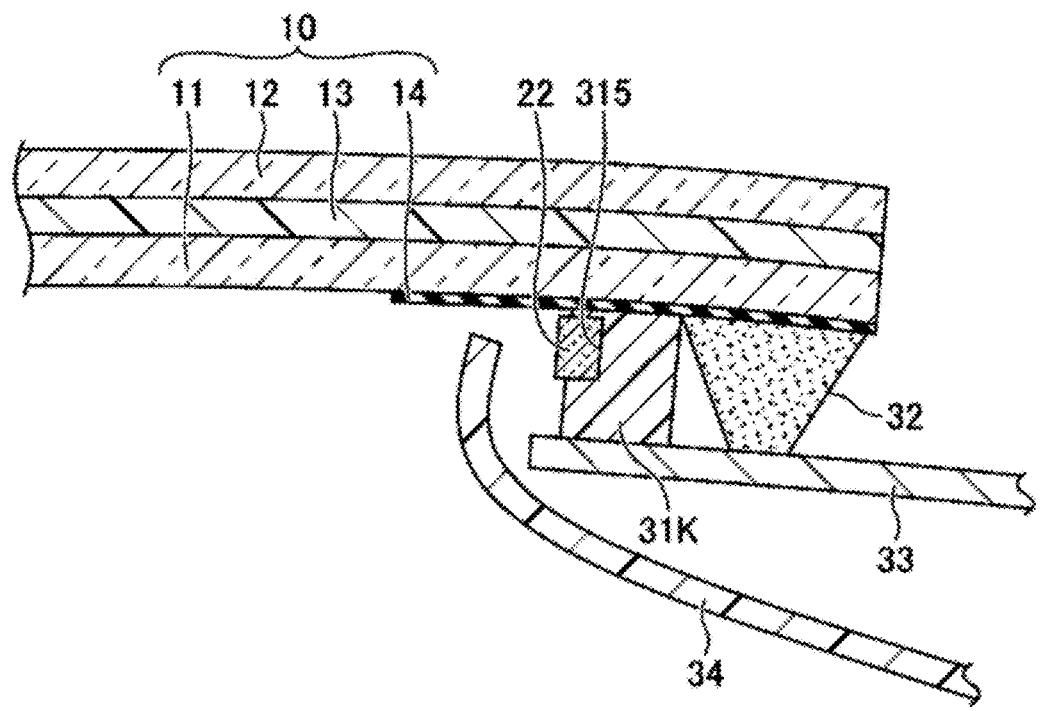

FIG. 8(*a*) is a cross sectional view illustrating a vehicle window structure according to modified example 1 of the second embodiment and illustrates a cross section corresponding to FIG. 7(*b*).

In the vehicle window structure 2A according to modified example 1 of the second embodiment shown in FIG. 8(*a*), instead of the dam rubber 31, a light guide material 22A is disposed between the laminated glass 10 and the body flange 33. The light guide material 22A has the same function as the light guide material 22. The light guide material 22A further functions as a spacer to specify the distance between the laminated glass 10 and the body flange 33 and plays a role as a dam to prevent the urethane adhesive 32 before curing from flowing out as well. That is, the light guide material 22A functions as a spacer to specify the distance between the laminated glass 10 and the body flange 33. As described above, instead of the dam rubber 31, a light guide material 22A having a height at the same level as the dam rubber 31 may be disposed.

FIG. 8(*b*) is a cross sectional view illustrating a vehicle window structure according to modified example 2 of the second embodiment and illustrates a cross section corresponding to FIG. 7(*b*).

As shown in FIG. 8(*b*), in a vehicle window structure 2B according to modified example 2 of the second embodiment, instead of the dam rubber 31, a bracket 31K is provided, and the light guide material 22 is fixed to light guide material attachment grooves 31s provided on the bracket 31K. The light guide material 22 preferably protrudes from a surface facing the vehicle interior side of the bracket 31K, in that light is diffused.

Figure 9A:
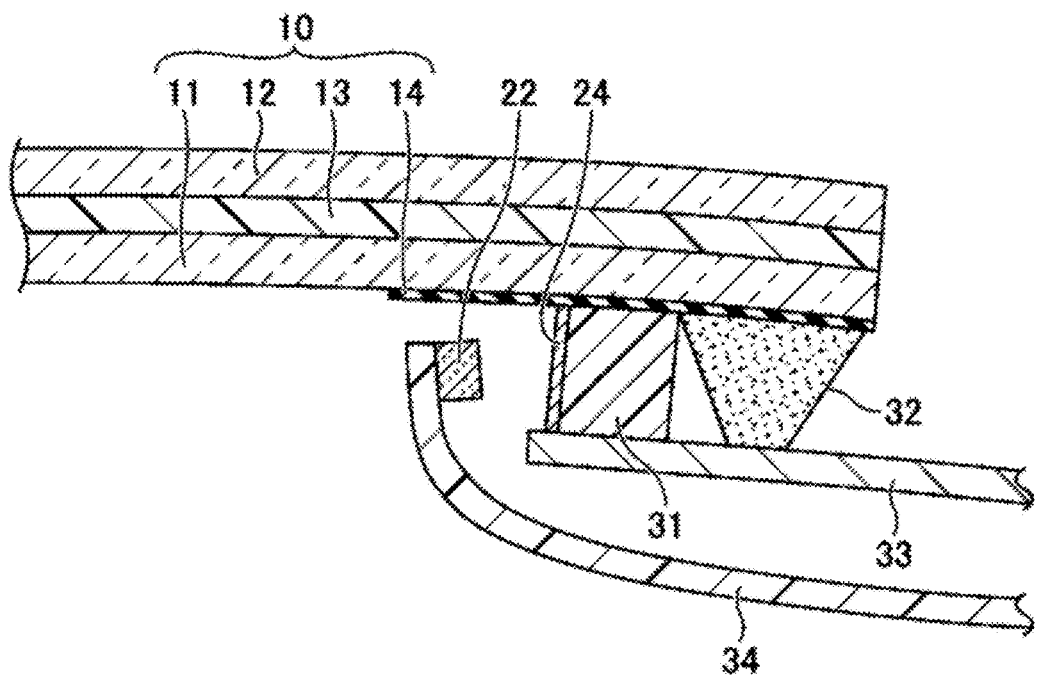
FIGS. 9(a) and 9(b) are cross-sectional views illustrating a vehicle window structure according to modified examples 3 and 4 of the second embodiment.
Figure 9B:
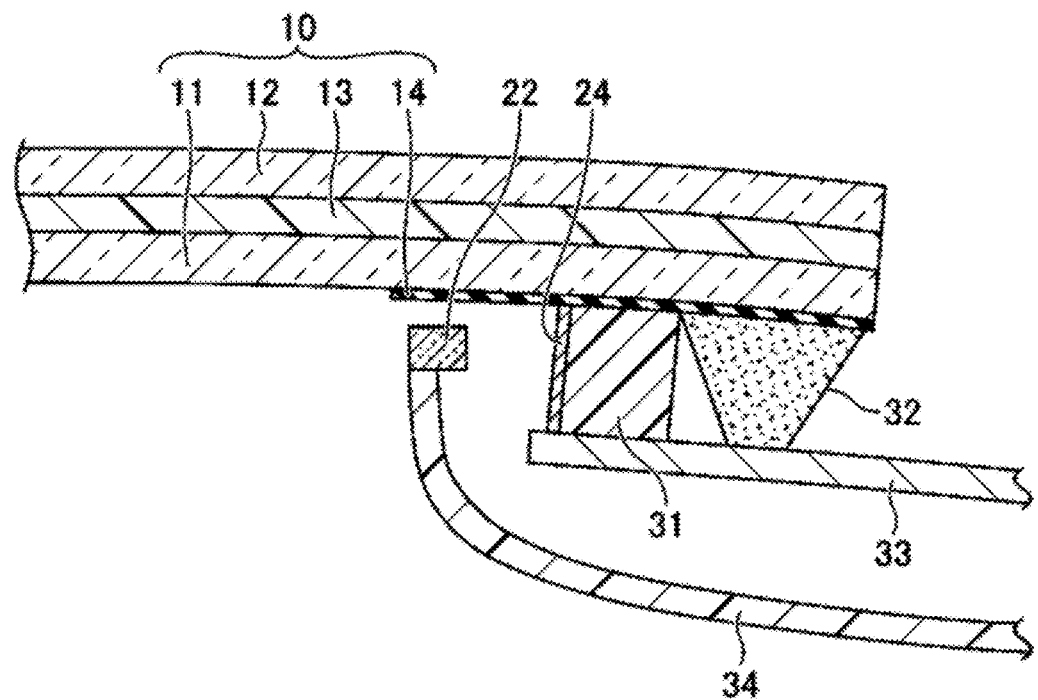

FIG. 9(*a*) is a cross sectional view illustrating a vehicle window structure according to modified example 3 of the second embodiment and illustrates a cross section corresponding to FIG. 7(*b*).

As in the vehicle window structure 2C according to modified example 3 of the second embodiment shown in FIG. 9(*a*), the light guide material 22 may be fixed to a surface facing the dam rubber 31 side of the interior material 34 e.g. with an adhesive.

Light guided and given by the light guide material 22 is reflected on the reflecting material 24 provided on the surface facing the vehicle interior side of the dam rubber 31 and becomes visually recognized from the vehicle interior side. The same effects will be obtained by providing a diffusing material instead of the reflecting material 24.

FIG. 9(*b*) is a cross sectional view illustrating a vehicle window structure according to modified example 4 of the second embodiment and illustrates a cross section corresponding to FIG. 7(*b*). As in the vehicle window structure 2D according to modified example 4 of the second embodiment shown in FIG. 9(*b*), the same effects will be obtained as in the case of FIG. 9(*a*) also when the light guide material 22 is disposed to the edge portion on the laminated glass 10 side of the interior material 34.

Figure 10A:
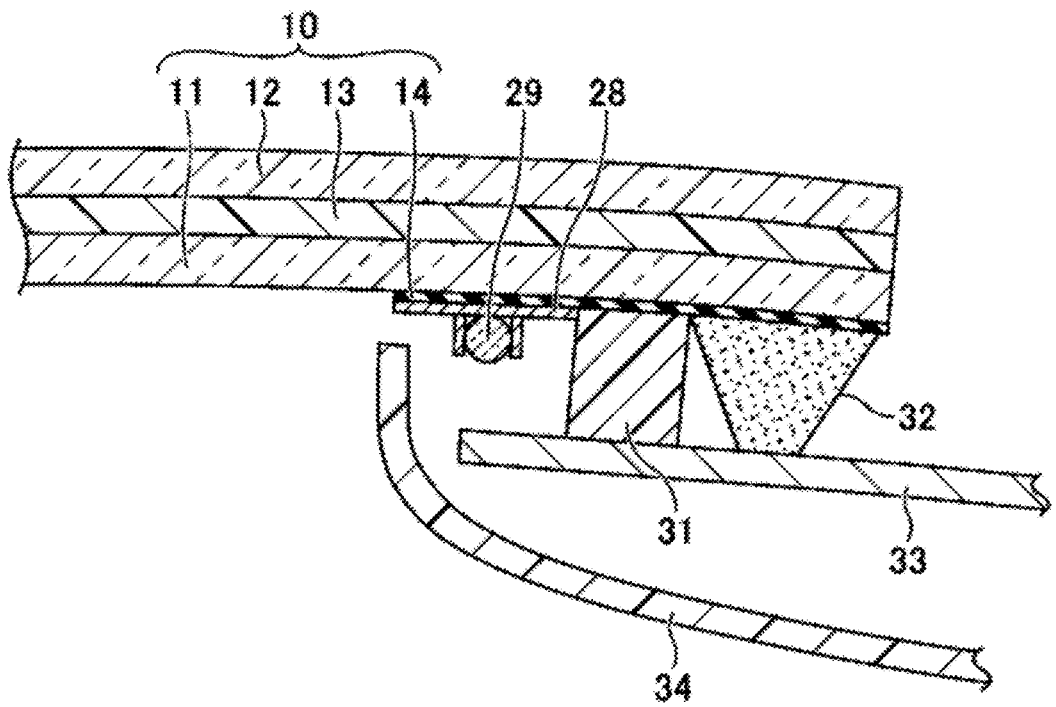
FIGS. 10(a) and 10(b) are cross-sectional views illustrating a vehicle window structure according to modified examples 5 and 6 of the second embodiment.
Figure 10B:
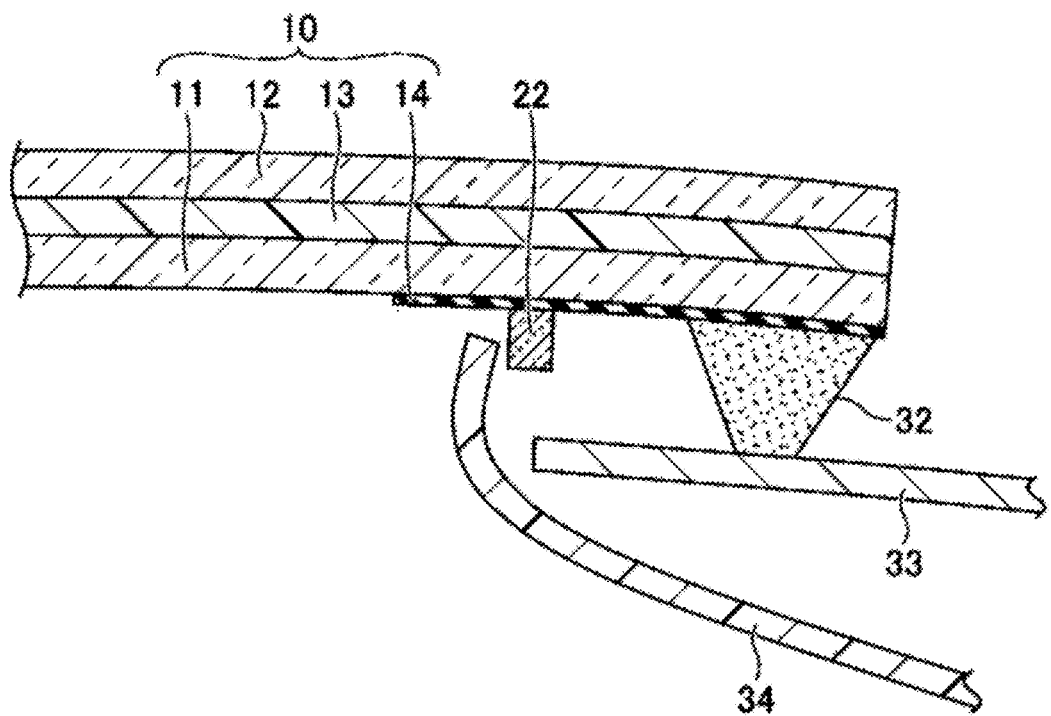

FIG. 10(*a*) is a cross sectional view illustrating a vehicle window structure according to modified example 5 of the second embodiment and illustrates a cross section corresponding to FIG. 7(*b*). As in the vehicle window structure 2E according to modified example 5 of the second embodiment shown in FIG. 10(*a*), a fiber guide 28 may be provided on a shielding layer 14 and an optical fiber 29 to be the light guide material is fixed on the fiber guide 28.

FIG. 10(*b*) is a cross sectional view illustrating a vehicle window structure according to modified example 6 of the second embodiment and illustrates a cross section corresponding to FIG. 7(*b*). As in the vehicle window structure 2F according to modified example 6 of the second embodiment shown in FIG. 10(*b*), the urethane adhesive 32 may be made to have a function as a spacer, without providing the dam rubber. The structure of FIG. 10(*b*) may be applicable to other embodiments of the first embodiment and the second embodiment, in which the light emitting elements or the light guide material is not fixed to the dam rubber or the bracket which replaces the dam rubber.

The preferred embodiments, etc. are described in detail above. However, it should be understood that various changes and modifications are possible without departing from the intension and the scope of the present invention.

REFERENCE SYMBOLS 1, 1A to 1I, 2, 2A to 2D: vehicle window structure
10: laminated glass
$10_1$: upper edge portion
$10_2$: lower edge portion
$10_3$: left edge portion
$10_4$: right edge portion
11, 12: glass plate
13: interlayer
14: shielding layer
20, 20A, 20B, 20J: light emitting device
21: light emitting element
22, 22A: light guide material
23: substrate
24: reflecting material
28: fiber guide
29: optical fiber
31: dam rubber
31A, 31C, 31D, 31E, 31K: bracket
32: urethane adhesive
33: body flange
34: interior material
211, 311 attachment terminal 313: light emitting element attachment groove
315: light guide material attachment groove
341: transmission region.

What is claimed is:

1. A vehicle window structure to be installed at an opening of a vehicle, the vehicle window structure comprising a first glass plate and a light emitting device, wherein:
the light emitting device comprises light emitting elements;
the light emitting elements are fixed to a surface on a vehicle interior side of the first glass plate or in a space on the vehicle interior side of the first glass plate; and
the light emitting elements are disposed in a space formed between the first glass plate, an adhesive bonding the first glass plate and a body flange of the vehicle, and an interior material of the vehicle.

2. The vehicle window structure according to claim 1, wherein the light emitting device comprises:
an optical member containing at least one of a light guide material which light emitted from the light emitting elements enters;
a reflecting material which reflects light emitted from the light emitting element; and
a diffusing material which diffuses light emitted from the light emitting element.

3. The vehicle window structure according to claim 2, wherein the light emitting elements and/or the optical member is fixed to the first glass plate.

4. The vehicle window structure according to claim 2, wherein between the first glass plate and the body flange, a spacer to specify the distance between the first glass plate and the body flange is provided, and
the light emitting elements and/or the optical member is fixed to the spacer.

5. The vehicle window structure according to claim 4, wherein the spacer has an inclined surface with an inclination angle of 5° or more and 85° or less to the thickness direction of the first glass plate.

6. The vehicle window structure according to claim 2, wherein the optical member is disposed between the first glass plate and the body flange, and the optical member functions also as a spacer to specify the distance between the first glass plate and the body flange.

7. The vehicle window structure according to claim 2, wherein a spacer to specify the distance between the first glass plate and the body flange is provided, and the light emitting elements and the optical member are removable from the spacer.

8. The vehicle window structure according to claim 2, wherein the light emitting elements and/or the optical member is fixed to the interior material.

9. The vehicle window structure according to claim 2, wherein the light emitting elements and/or the optical member is fixed to the body flange.

10. The vehicle window structure according to claim 2, wherein light given from the light emitting elements and/or the optical member is transmitted through a transparent region provided on the interior material and reaches the vehicle interior side.

11. The vehicle window structure according to claim 2, wherein the optical member is the light guide material.

12. The vehicle window structure according to claim 11, wherein the member which reflects or diffuses light given from the light emitting elements and/or the light guide material is disposed in the space.

13. The vehicle window structure according to claim 2, wherein the optical member is the reflecting material and/or the diffusing material, the reflecting material and/or the diffusing material is formed of a transparent material and disposed on a surface on the vehicle interior side of the first glass plate and, when the first glass plate is viewed two-dimensionally, extends to the center side than a shielding layer formed at the periphery of a surface on the vehicle interior side of the first glass plate.

14. The vehicle window structure according to claim 2, wherein when the first glass plate is viewed two-dimensionally, the light emitting elements and/or the optical member is disposed at a portion overlapping with a shielding layer formed at the periphery of a surface on the vehicle interior side of the first glass plate.

15. The vehicle window structure according to claim 2, wherein the light emitting elements are disposed in a line along the predetermined edge portion of the first glass plate.

16. The vehicle window structure according to claim 2, wherein the light emitting elements and the optical member are alternately disposed along the predetermined edge portion of the first glass plate.

17. The vehicle window structure according to claim 1, which further has a second glass plate on the vehicle exterior side of the first glass plate, and has an interlayer between the first glass plate and the second glass plate.

* * * * *